Aug. 29, 1967 R. V. QUINLAN 3,339,017

TELEVISION BANDWIDTH SYSTEM AND METHOD

Filed July 28, 1964

14 Sheets-Sheet 1

INVENTOR
ROBERT V. QUINLAN
BY Hood, Gust & Irish
ATTORNEYS

INVENTOR
ROBERT V. QUINLAN
BY Hood, Gust & Irish
ATTORNEYS

Aug. 29, 1967 R. V. QUINLAN 3,339,017

TELEVISION BANDWIDTH SYSTEM AND METHOD

Filed July 28, 1964 14 Sheets-Sheet 3

INVENTOR
ROBERT V. QUINLAN

BY Hood, Gust & Irish

ATTORNEYS

INVENTOR
ROBERT V. QUINLAN
BY Hood, Gust & Irish
ATTORNEYS

INVENTOR
ROBERT V. QUINLAN
BY Hood, Gust & Irish
ATTORNEYS

INVENTOR
ROBERT V. QUINLAN
BY Hood, Gust + Irish
ATTORNEYS

INVENTOR
ROBERT V. QUINLAN
BY Hood, Gust & Irish
ATTORNEYS

INVENTOR
ROBERT V. QUINLAN
BY Hood, Gust & Irish
ATTORNEYS

INVENTOR
ROBERT V. QUINLAN
BY Hood, Gust + Irish
ATTORNEYS

INVENTOR
ROBERT V. QUINLAN
BY Hood, Gust & Irish
ATTORNEYS

INVENTOR
ROBERT V. QUINLAN
BY Hood, Gust + Irish
ATTORNEYS

INVENTOR
ROBERT V. QUINLAN
BY Hood, Gust & Irish
ATTORNEYS

Aug. 29, 1967 R. V. QUINLAN 3,339,017

TELEVISION BANDWIDTH SYSTEM AND METHOD

Filed July 28, 1964

14 Sheets-Sheet 13

INVENTOR
ROBERT V. QUINLAN
BY Hood, Gust & Irish
ATTORNEYS

INVENTOR
ROBERT V. QUINLAN
BY Hood, Gust, Irish
ATTORNEYS

United States Patent Office 3,339,017
Patented Aug. 29, 1967

3,339,017
TELEVISION BANDWIDTH SYSTEM AND METHOD

Robert V. Quinlan, Fort Wayne, Ind., assignor to International Telephone and Telegraph Corporation, Nutley, N.J., a corporation of Maryland
Filed July 28, 1964, Ser. No. 385,625
22 Claims. (Cl. 178—6.8)

This invention relates generally to a television system and method, and more particularly to a time-bandwidth compression system and method for television transmission.

Conventional television systems, by virtue of their fast scanning rates which are required for transmission of moving images with high resolution, require an extremely wide-band transmission facility. There are numerous instances, however, where it is not necessary to transmit a moving image, but on the contrary where it is only desired rapidly to transmit a still image such as a photograph or "snap shot" taken from a moving scene, or a two color printed document. It is further highly desirable that a television system for transmission of such still images be capable of operation over ordinary voice band telephone lines, even at great distances.

Conventional closed circuit television systems have been employed for the transmission of still pictures, however, as indicated, a wideband transmission facility such as coaxial cable or a microwave link has been required. Conventional facsimile systems have also been employed for the transmission of still images, however, in such systems the transmission time of a single picture requires appreciable time, i.e., ordinarily from three to ten minutes.

Television systems and methods employing slow scanning rates have been proposed for transmitting still pictures over narrow-band facilities, such as that described and illustrated in application Ser. No. 246,103 filed Dec. 20, 1962, now Patent No. 3,251,937 of Nelson E. Hoag, assigned to the assignee of the present application. The system of that application employs three scanning speeds to provide transmission times of ten, twenty or forty seconds per frame depending upon the desired resolution; the slowest scanning rate is used for copy which contains the largest amount of fine detail. It is, however, further desirable in such a narrow-band television transmission system to transmit the video signals in the minimum time without adversely affecting the resolution. It is further desirable that a transmission time reduction system be simple and readily adaptable both to existing slow scan television transmission systems, such as that described and illustrated in the aforementioned Nelson E. Hoag application, and to conventional television transmission systems.

Most printed documents, such as ordinary typewritten pages, and many half-tone images, include a substantial amount of redundant information, i.e., the background or "white" color upon which the contrasting or "black" intelligence information appears. It will be readily understood that the time required for transmission of the still image of a printed document or half-tone picture can be accelerated by compressing the redundant information, i.e., by compressing the information in a frame into less than the normal transmission time by elimination of some amount of the redundancy. Application Ser. No. 318,682 filed Oct. 24, 1963, now Patent No. 3,286,026, of Weldon W. Greutman and Nelson E. Hoag, and assigned to the assignee of the present application, describes and illustrates a time-bandwidth compression system utilizing a clock pulse to sample the scanned video signal. That system, however, not only is restricted to transmission of two color still images, but also produces horizontal quantizing in addition to the vertical quantizing caused by the discrete scanning lines; in the system described and illustrated in the above-mentioned application Ser. No. 246,103, vertical scanning lines are employed in contrast with the horizontal scanning lines employed in conventional broadcast television, and thus the term "horizontal" as used herein refers to a direction parallel with the line scanning and perpendicular to frame scanning. Experience with broadcast television has shown that approximately seventy-five percent of the picture elements in the vertical direction are separately reproduced by the scanning lines, the remainder being merged together. If "horizontal" sampling is employed, there will be a similar decrease in the "horizontal" resolution and thus to provide the same picture resolution in a time-bandwidth compression system utilizing clock pulses to sample a scanned video, the bandwidth must be increased. Thus, if the "horizontal" resolution loss is twenty-five percent due to "horizontal" sampling, the time-bandwidth compression must be increased by 1.33 in order to provide the same resolution.

It is therefore further desirable to provide a time-bandwidth compression system and method which does not introduce an inherent decrease in the resolution provided in the above-described system utilizing clock pulses to obtain "horizontal" sampling of the scanned video, and which further is not restricted to transmission of two-color images.

The bandwidth and/or transmission time in a television system is limited by the smallest element of intelligence in the image which is required to be transmitted. Conventional television systems of both the fast and slow scanning rate varieties have employed uniform scanning rates, both line and frame. Assuming now that a black and white image is exposed to the camera tube of a television system, with the image comprising a single "black" letter I appearing on a "white" background, and that this image is rectilinearly scanned to provide a time-based video signal, as is well known to those skilled in the art. Assuming further that scanning of this image provides a "white"-positive output video signal and a "black"-negative output signal from the camera tube, it will be seen that scanning of the single "black" character I on the image by a single scanning line will provide a "white" output video signal responsive to the "white" background color in the image for a period of time far in excess of the duration of the "black" output video signal which appears only when the "black" character I is scanned and which conveys the useful intelligence, i.e., the "white" output video signal is conveying redundant information prior to and after occurrence of the "black" output video signal. It will now be readily seen that if the scanning speed of the camera tube at the transmitting station and of the display tube at the receiving station are simultaneously increased when transmitting long runs of such redundant information, i.e., for example white, thus in essence condensing or compressing the redundant information into a single coded pulse, the time required for transmission of the image may be substantially decreased.

Assuming that a television system must be capable of transmitting typewritten information with good resolution, it will be seen that a full typewritten page contains the largest concentration of "black" information and, hence offers the least potential transmission time reduction; pica type is approximately .1 inch high and .06 inch wide with the thickness of each letter being about .01 inch. Approximately eighty percent of a fully typewritten area is "white" and if the borders of a page are included, this figure is still higher. In addition, approximately two percent of typewritten page contains runs of single white elements contained in the middle of certain letters (now being defined as "white" or "black" elements having a width of .01 inch in the scanning direction). In a typewritten page, single black elements occur more frequently because of the thickness of the letters and thus, while it will be seen that while the scanning rate can be increased to code, i.e., compress redundant information having either characteristic, i.e., "white" or "black" in the case of a typewritten page, a greater reduction in transmission time is possible by coding "white" redundant information than by coding "black" redundant information. Thus in the case of a fully typewritten page, if each run of two "white" elements was transmitted as one video pulse having a duration corresponding to a single element, the total transmission time would be reduced by approximately 1.6; and an all white page would yield a 2:1 reduction in transmission time. It will further be seen that if each run of five white elements were transmitted as one pulse, the transmission time could be reduced by a factor of 2.5.

In accordance with the time-bandwidth compression system and method of the invention, consecutive scanning lines are utilized, as in conventional television systems. When information of a given characteristic, such as "white" in the image to be transmitted is encountered during scanning, the scanning speed is increased and this information is transmitted at a first video signal level. If, however, the "white" video signal information has a duration less than a predetermined time, or the information has another characteristic, for example, "black," the scanning speed is reduced to a lower normal rate and is transmitted at a second level in the case of a "black" information and at a third intermediate level in the case of "white" information. Thus, in accordance with the system and method of the invention, the video signal is transmitted in three levels, i.e., "black," normal-sweep "white" and fast-sweep "white." The receiver detects these three video signal levels, providing the fast scanning speed for the display tube when a first, i.e., fast-sweep "white" video signal is encountered and providing the normal scanning speed when a second level, i.e., "black" or a third level, i.e., normal-sweep "white" video signal is encountered, both the first and third level video signals being reproduced as a "white" image by the display tube. While the expression "black" has been employed in connection with the second level video signal, it will be understood that a grey scale range is permissible between the third level video signal, i.e., normal-sweep "white" and the second level video signal, i.e., "black."

It is accordingly an object of the invention to provide an improved time-bandwidth compression system for television transmission.

Another object of the invention is to provide an improved method of time-bandwidth compression for television transmission.

A further object of the invention is to provide an improved time-bandwidth compression system and method for television transmission which is not restricted to the transmission of two-tone information.

A still further object of the invention is to provide an improved time-bandwidth compression system and method for television transmission which can readily be incorporated in existing television systems.

Yet another object of the invention is to provide an improved time-bandwidth compression system and method for television transmission in which resolution is improved over prior time-bandwidth compression systems and methods without any corresponding increase in bandwidth.

The above-mentioned and other features and objects of the invention and the manner of obtaining them will become more apparent and the invention itself will be best understood by reference to the following description of embodiments of the invention taken in conjunction with the accompanying drawings, wherein:

FIG. 8 is a diagram showing the signals provided in the receiving apparatus of FIG. 2 during the same scanning line as shown in FIG. 7;

Figure 1:
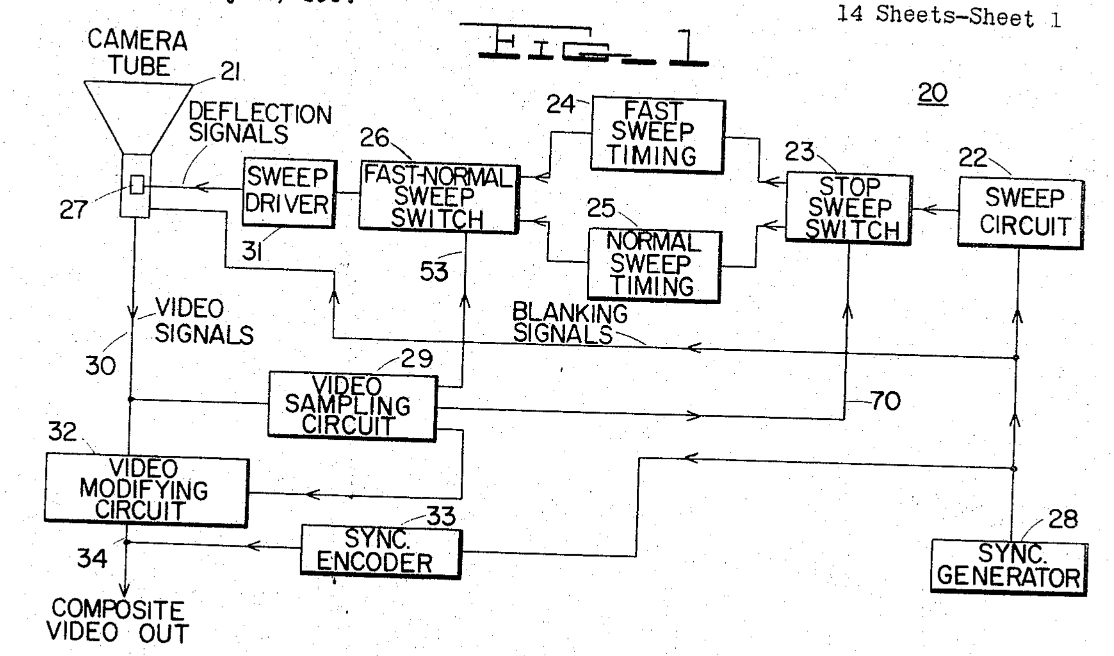
FIG. 1 is a schematic block diagram generally showing the system of the transmitting station of the invention.

Referring now to FIG. 1, the transmission system of the invention, generally identified at 20 comprises a suitable camera tube 21, which may be a vidicon tube, such as the WL-7290, or which may be any other conventional camera tube including an image orthicon, image dissector, or flying spot scanner, as is well known to those skilled in the art. In each of these tubes, the optical image to be transmitted is converted into a corresponding electrical characteristic pattern and an electron beam is generated which is scanned over a target electrode in the case of each of the tubes other than the image dissector tube thereby to generate a time-based video signal; in the case of the image dissector tube, the beam is generated by a photocathode upon which the optical image is impressed and is thus area-modulated in accordance with the image, this beam being scanned over a defining aperture to generate the video signal. In the case of the vidicon tube which is employed in the slow-scan television system of the above-referred to application Ser. No. 246,103, a shutter mechanism momentarily exposes the target electrode to the optical image which discharges the target electrode, and subsequent scanning during one frame recharges the target electrode to generate the time-based video signal.

A conventional sweep generating circuit, i.e., a constant current source 22 is provided coupled by stop sweep switch 23 to fast and normal sweep timing circuits 24, 25, which in turn are coupled by fast-normal sweep switch 26 to sweep driver 31 and to the deflection elements 27 of the camera tube 21. A conventional synchronizing and blanking signal generator 28 is provided coupled to the sweep circuit 22 for resetting the line and frame sweeps and also coupled to the camera tube 21 for blanking the same during line and frame retract, as is well known to those skilled in the art.

A video sampling circuit 29, to be hereinafter more fully described, is provided coupled to the video signal output circuit 30 of the camera tube 21 and to the stop sweep switch 23 and fast-sweep switch 26. A video signal modifying circuit 32 is also provided coupled to the video signal output circuit 30 of the camera tube 21 and to the video sampling circuit 29. The raw or initial video signals appearing in the output circuit 30 of the camera tube 21 are sampled by sampling circuit 29, as will be hereinafter more fully described, and when "black" is encountered, the sampling circuit 29 actuates the fast-sweep switch 26 to couple the normal sweep timing circuit 25 to the deflection elements 27 of the camera tube 21 so that the image is scanned at the normal, i.e., slow rate. If a "white" video signal is encountered, the sampling circuit 29 actuates the fast-sweep switch 26 to couple the fast sweep timing circuit 24 to the deflection elements 27 of the camera tube 21 so that the image is scanned at the fast rate.

In accordance with the invention, if the fast-sweep "white" video signal has a duration shorter than a predetermined minimum time, the sampling circuit 29 actuates the stop sweep switch 23 to interrupt the scanning for a period of time which when added to the duration of the shorter "white" video signal, bears the same relation to the shorter signal as the relation of the fast scanning rate to the slow scanning rate. Thus, if the fast scanning rate bears a 2:1 relationship to the slow scanning rate, the stop sweep switch 23 is actuated to interrupt the sweep for a time equal to the duration of the shorter "white" signal, whereas if the fast scanning rate bears a 3:1 relation to the slow scanning rate, the scanning would be interrupted for a period of time twice the duration of the shorter "white" signal.

When such a "white" fast-sweep signal is sensed having a duration shorter than the predetermined time and the sweep is thus interrupted as above-described, the video modifying circuit 32 is actuated to generate a normal-sweep "white" video signal having a third level intermediate the fast-sweep "white" video signal level and the slow-sweep "black" video signal level, this normal-sweep "white" signal having a duration equal to that of the shorter fast-sweep "white" signal plus the duration of the interruption of the sweep, i.e., the normal-sweep "white" signal has a duration the same as that which would have been provided if the white information had been scanned initially at the slow rate. For example, assuming that the minimum video signal which can be transmitted is 100 microseconds and that a 2:1 ratio of fast to slow scanning rates is provided in turn to provide a 2:1 compression ratio, if the fast-sweep "white" video signal has a duration longer than 100 microseconds, it will be transmitted directly at a first "whiter-than-white" level. However, if in scanning at the fast rate the duration of the "white" signal is found to be less than 100 microseconds, i.e., such as 75 microseconds, the sweep will be interrupted for an equal time, i.e., 75 microseconds, and the video modifying circuit will produce a 150 microsecond video signal at the normal-white level, i.e., intermediate the fast-"white" level and the "black" level.

It will be understood that two contrasting characteristics in the image viewed by the camera tube, such as "white" and "black," respectively, will provide initial video signals having two extreme levels, such as "white"-positive and "black"-negative, the "white"-positive being the fast-sweep "white," with the normal-sweep "white" level signal provided by the video modifying circuit 32 in response to a shorter "white" level initial video signal having a level intermediate the fast-sweep "white" level signal and the "black" level video signal. It will also be seen that video signals responsive to a grey scale range may be provided having levels intermediate the "black" level video signals and the normal-sweep "white" level video signals.

As will be hereinafter more fully described, a synchronizing signal encoding circuit 33 may couple the synchronizing and blanking signal generator 28 to the output circuit 34 of the video modifying circuit 32 in order to provide a coded three-level synchronizing signal for transmission. It will be readily understood that the output circuit 34 of the video modifying circuit is coupled to conventional transmission apparatus, which may be of the type described and illustrated in the above-mentioned application Ser. No. 246,103.

Figure 2:
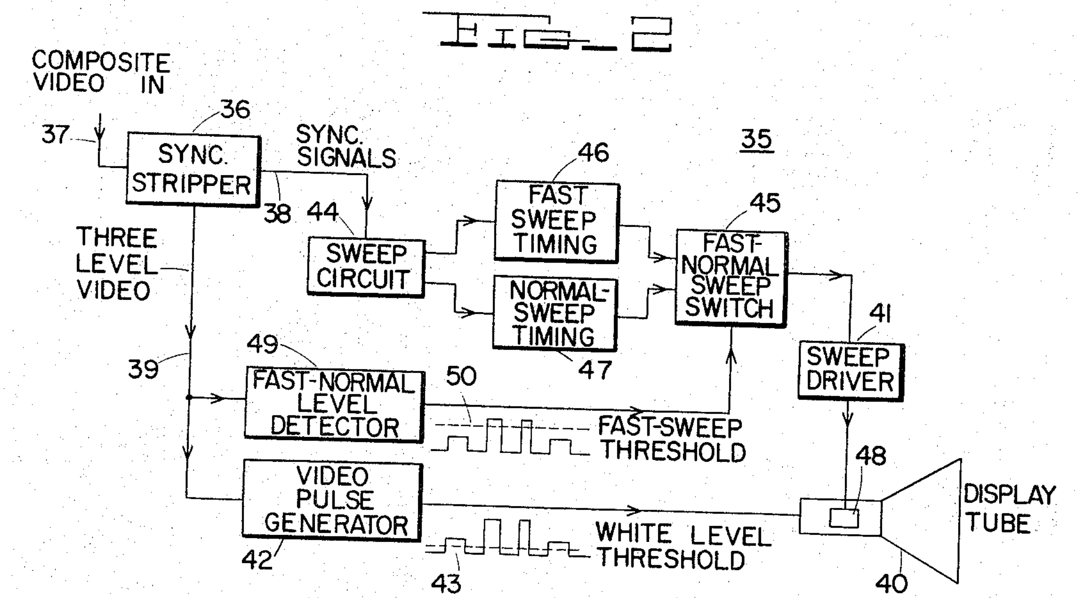
FIG. 2 is a schematic block diagram generally showing the system of the receiving station of the invention.

Referring now to FIG. 2, the receiving station of the invention, generally indicated at 35, comprises suitable synchronizing signal decoding or "sync. stripping" circuitry 36, to be hereinafter more fully described, having an input circuit 37 coupled to conventional reception and detecting apparatus (not shown). Sync. stripper 36 has a first output circuit 38 in wihch the separated synchronizing signals appear and a second output circuit 39 in which the separated video signals appear. A signal-to-image display tube 40 is provided, which may be a conventional signal-to-image storage display tube, having its control grid (not shown) coupled to the output circuit 39 of the sync. stripper 36 by a video pulse generator 42. Video pulse generator 42 generates signal pulses which, when applied to the control grid of the display tube 40, provide a "white" displayed image in response to received video signals which exceed a predetermined threshold level shown by the dashed line 43, i.e., the first level fast-sweep "white" video signals and the intermediate level normal-sweep "white" video signals. Both the first level "fast white" or fast-sweep "white" video signals and the second level normal-sweep "white" video signals provide a "white" display on the display tube 40 whereas the second level "black" video signals result in a "black" display on the tube 40.

Sweep circuit 44 is provided, which may be identical to the sweep circuit 22 of the transmitting station, coupled to fast-normal sweep switch 45 by fast and normal sweep timing circuits 46, 47; fast-normal sweep switch 45 and the fast and normal sweep timing circuits 46, 47 may likewise be identical to the fast and normal sweep timing circuits 24, 25 and the fast-normal sweep switch 26 of the transmitting station. Fast-normal sweep switch 45 selectively couples the fast and normal sweep timing circuits 46, 47 to a sweep driver 41 which is coupled to the deflection elements 48 of display tube 40.

Fast-normal level detector circuit 49 couples the output circuit 39 of the sync. stripper 36 to fast-sweep switch 45. The fast-normal level detector circuit 49 detects video signals having a level above the threshold level shown by the dashed line 50, i.e., the first level or fast-sweep "white" signals and actuates the fast-sweep switch 45 in response thereto to couple the fast-sweep timing circuit 46 to the deflection elements 48 of the display tube 40. Thus, when a fast-sweep "white" received video signal is encountered in output circuit 39 of the sync. stripper circuit 36, fast-sweep switch 45 is actuated to couple the fast-sweep timing circuit 46 to the deflection elements 48 of the display tube 40 thus to provide fast sweep of the electron beam in the display tube at the same rate as the fast sweep employed in the camera tube 21. However, when a second level or "black" received video signal, or a third level or normal-sweep "white" video signal is encountered, fast-sweep switch 45 is actuated to couple the normal-sweep timing circuit 47 to the deflection element 48 so that the electron beam in the display tube 40 is scanned at the same normal sweep rate as that employed in the camera tube 21. It will be readily understood that the separated synchronizing signals appearing in the output circuit 38 of the sync. stripper circuit 36 are applied to the sweep circuit 44 to reset the sweeps, as is well known to those skilled in the art.

Figure 3:
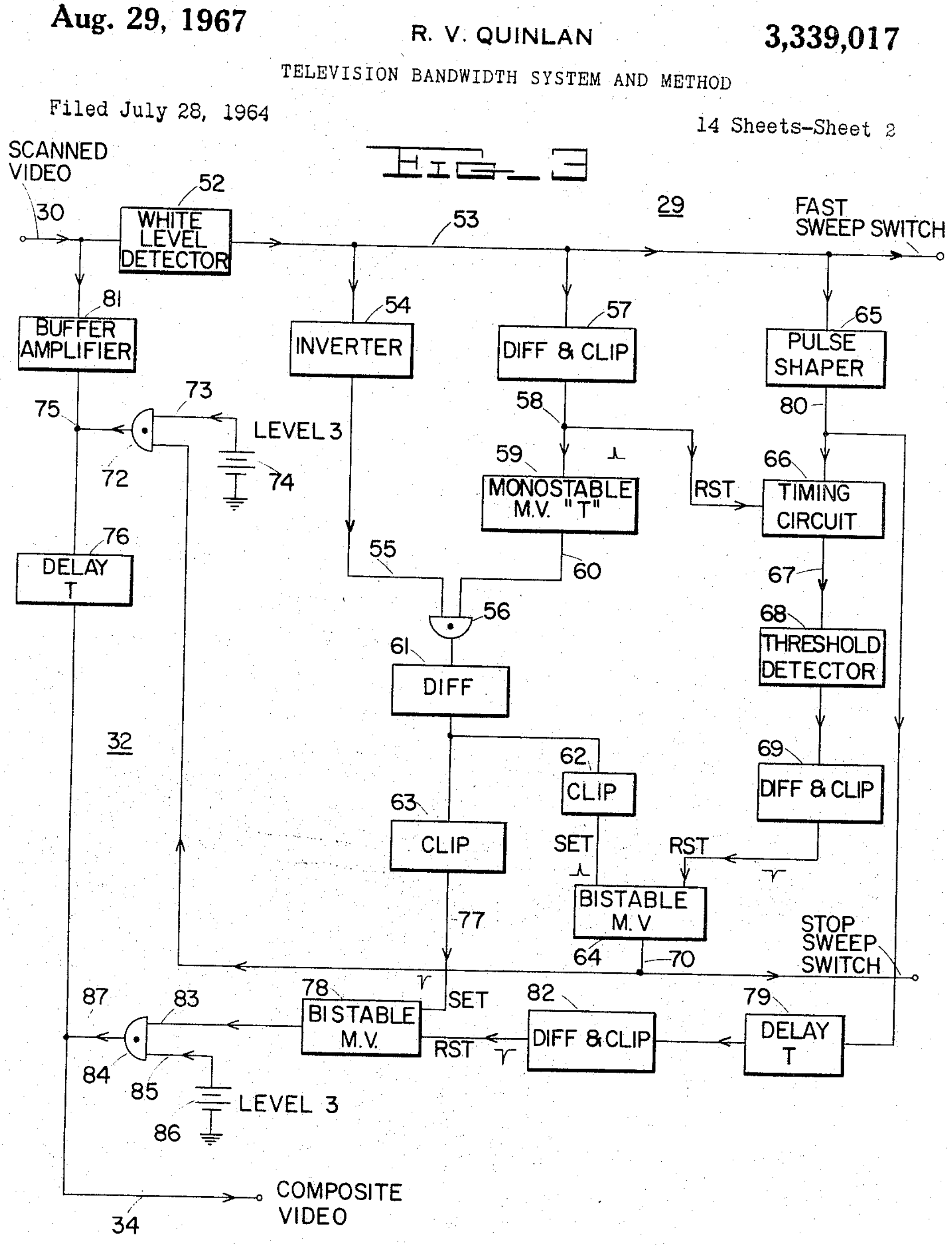
FIG. 3 is a schematic block diagram showing one embodiment of the video sampling and video modifying circuits of the system of FIG. 1.

Referring now to FIG. 3 in which one embodiment of the video sampling circuit 29 and video modifying circuit 32 of FIG. 1 is shown, and in which like elements are indicated by like reference numerals, white level detector circuit 52, which may be a conventional signal slicing circuit, is coupled to output circuit 30 of the camera tube 21 and has its output circuit 53 coupled to the fast-sweep switch 26. White level detector circuit 52 provides first control signals in its output circuit 53 respectively responsive to the "white" level initial video signals appearing in the output circuit 30 of the camera tube 21. A conventional signal inverting circuit 54 is coupled to the output circuit 53 of the white level detector 52 and to one input circuit 55 of a conventional AND gate 56, also identified as AND gate No. 3. A conventional differentiating and clipping circuit 57 is also coupled to the output circuit 53 of the white level detector 52. Output circuit 58 of the differentiating clipping circuit 57 is coupled to a conventional monostable multivibrator 59 which generates a pulse having a predetermined duration T in response to the leading edge differentiated signal provided by the differentiating and clipping circuit 57. The pulse T generated by monostable multivibrator 59 is the minimum transmission time referred to above. Output circuit 60 of the monostable multivibrator 59 is coupled to the other input circuit of the AND gate 56. Output circuit of the AND gate 56 is coupled to a conventional differentiating circuit 61. The output circuit of the differentiating circuit 61 is coupled to conventional clipping circuits 62 and 63. The output circuit of clipping circuit 62 is coupled to the "SET" circuit of a conventional bistable multivibrator 64.

The output circuit 53 of the white level detector circuit 52 is also coupled to a conventional pulse shaper circuit 65 which in turn is coupled to a timing circuit 66 which may comprise a conventional charging capacitor which measures the length of the pulse applied thereto by the pulse shaper circuit 65 by charging-up. Output circuit 58 of the differentiating and clipping circuit 57 is coupled to timing circuit 66 so that the leading edge differentiated signal provided by the differentiating and clipping circuit 57, which will be coincident with the beginning of the pulse impressed upon the timing circuit 66 by the pulse shaper 65, will initiate a fast discharge of the timing capacitor setting the voltage across the capacitor to zero. The signal appearing in the output circuit 67 of the timing circuit 66 will have a duration twice that of the control signal appearing in the output circuit 53 of the white level detector 52 for a fast-sweep to slow-sweep ratio of 2:1.

The output circuit 67 of timing circuit 66 is coupled to a conventional threshold detector 68 which in turn is coupled to another conventional differentiating and clipping circuit 69.

Differentiating and clipping circuit 69 is coupled to the "RESET" circuit of bistable multivibrator 64 for resetting the same in response to the differentiated trailing edge signal provided by the differentiating and clipping circuit 69. Output circuit 70 of the bistable multivibrator 64 is coupled to the stop-sweep switch 23 and also to one of the input circuits of AND gate 72. The other input circuit 73 of AND gate 72 is coupled to a source 74 of fixed direct current potential corresponding to the third or intermediate normal-sweep "white" level. Output circuit 75 of the AND gate 72 is coupled to the output of the buffer amplifier 81. Buffer amplifier 81 prevents signals appearing in the output circuit 75 from affecting output circuit 30 of the camera tube 21. When an output signal appears in output circuit 70 of bistable multivibrator, output circuit 75 will be clamped to the potential of source 74.

A conventional delay line 76 providing the same delay as the duration T provided by monostable multivibrator 59 is coupled between output circuit 75 of the buffer amplifier 81 and AND gate 72, and output circuit 34. Output circuit 77 of the clipping circuit 63 is coupled to the "SET" circuit of bistable multivibrator 78, the differentiated trailing edge signal provided by the differentiating circuit 61 and clipping circuit 63 setting the bistable multivibrator 78. Another conventional delay line 79, and providing the same delay as the duration of the pulse T provided by monostable multivibrator 59, is coupled to the output circuit 80 of pulse shaper 65. Delay line 79 is in turn coupled to conventional differentiating and clipping circuit 82, which is coupled to the "RESET" circuit of bistable multivibrator 78 so as to reset the same in response to the differentiated trailing edge signal provided by the differentiating and clipping circuit 82. Output circuit 83 of bistable multivibrator 78 is coupled to one of the input circuits of AND gate 84. The other input circuit 85 of the AND gate 84 is coupled to a source 86 of fixed direct current potential having the same level as source 74, i.e., the intermediate or third level normal-sweep "white" video signal level, and the output circuit 87 of the AND gate 84 is coupled to output circuit 34. Thus, when a signal appears in output circuit 83 from bistable multivibrator 78, output circuit 34 is clamped to the level of source 86.

Figure 4:
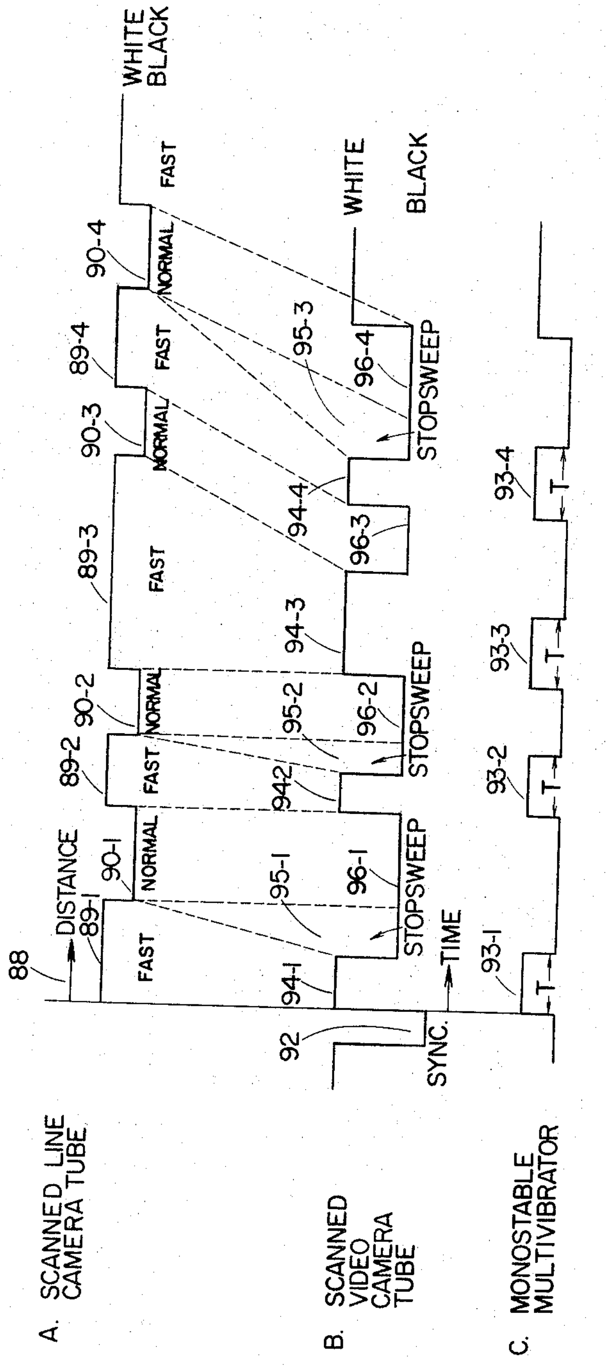
FIG. 4 is a diagram useful in explaining the mode of operation of the system of the invention.

Referring now to FIG. 4A, there is shown a portion of a typical scanned line on the camera tube 21. In FIG. 4A, in which distance is the ordinant and scanning is in the direction shown by the arrow 88, sections 89–1, 89–2, 89–3, and 89–4 of the scanned line are "white" information in the scanned image, whereas sections 90–1, 90–2, 90–3 and 90–4 are "black" information in the scanned image. As will be hereinafter more fully described, the electron beam of the camera tube 21 is caused to scan the "white" sections 89–1, 89–2, 89–3, 89–4 at the fast sweep rate, for example at twice the normal rate and is caused to scan the "black" sections 90–1, 90–2, 90–3 and 90–4 at the normal or slow-sweep rate.

Referring now to FIG. 4B in which the raw or initial video signal appearing in the output circuit 30 of the camera tube 21 is shown with time now being the ordinant, scanning of the line under consideration on the target electrode of the camera tube 21 is initiated by synchronizing signal 92 shown here as having a fourth "blacker-than-black" level lower than the "black" level. Referring additionally to FIG. 4C, pulses 93–1, 93–2, 93–3 and 93–4 provided by the monostable multivibrator 59 are shown, each having a duration T and each being initiated in response to a respective "white" level video signal in the output circuit 30 of the camera tube 21. Thus, white section 89–1 in the scanned line on the target electrode of the camera tube 21 results in a "white" level initial video signal 94–1 which provides a corresponding control signal in the output circuit 53 of the white level detector 52, which in turn initiates pulse 93–1 having duration T which is longer than the duration of the fast-sweep level "white" video signal 94–1. Thus, as will hereinafter be more fully described, the sweep is interrupted during interval 95–1 having the same duration as the "white" level initial video signal 94–1. At the conclusion of the stop sweep interval 95–1, the sweep is resumed and since the black section 90–1 in the scanned image is encountered the sweep will be at the normal or slow rate to provide "black" level video signal 96–1. When the next "white" section 89–2 in the scanned line is encountered, the scanning rate is increased to the fast rate resulting in fast-sweep "white" level initial video signal 94–2 which in turn initiates monostable multivibrator pulse 93–2. Pulse 93–2 will be seen to have a duration longer than that of the "white" level initial video signal 94–2 which will result in interruption of the sweep during interval 95–2 having the same duration as that of the "white" level initial video signal 94–2. At the end of interval 95–2, the sweep will be resumed at the normal or slow rate by virtue of the presence of the "black" section 90–2 in the scanned line resulting in "black" level initial video signal 96–2. Upon reaching the "white" section 89–3 in the scanned line, fast-sweep "white" initial level video signal 94–3 is generated resulting in generation of monostable multivibrator pulse 93–3. The fast-sweep "white" video signal 94–3, however, has a duration greater than that of monostable multivibrator pulse 93–3 so that the sweep is not interrupted, but on the contrary continues at the fast rate until the "black" section 90–3 in the scanned line is encountered at which point the scanning rate is reduced to the normal or slow rate and "black" level initial video signal 96–3 is provided. In like fashion "white" section 89–4 in the scanned line is scanned at the fast rate to provide fast-sweep "white" initial video signal 94–4 which in turn generates monostable multivibrator pulse 93–4 which, being of a longer duration than the fast-sweep "white" video signal 94–4, causes interruption of the sweep during the interval 95–3 having the same duration as the fast-sweep "white" video signal 94–4. Interruption of the sweep during interval 95–3 is followed by scanning at the normal or slow rate during the "black" section 90–4 in the scanned line to provide "black" level video signal 96–4.

Comparison of FIGS. 4A and 4B, which shows only a small segment of a scanned line on the target electrode of the camera tube 21 and the resultant initial video signal in the output circuit 30 of the camera tube 21 will reveal that the video signal is generated during a period of time less than would be required if the respective line on the target electrode was continuously scanned at the normal or slow rate.

Figure 5:
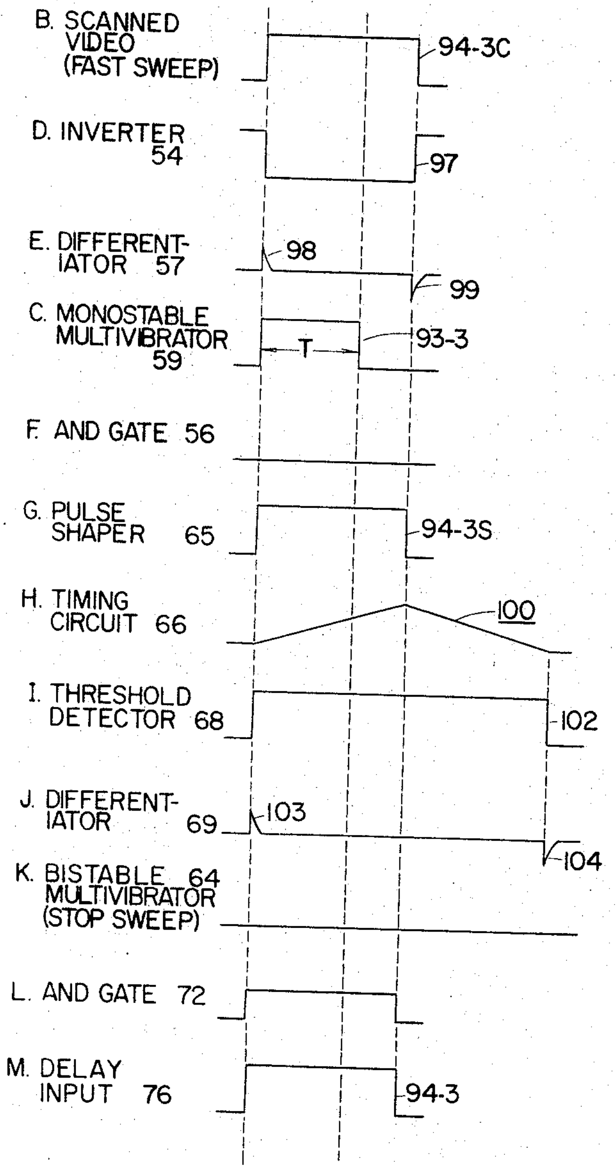
FIGS. 5 and 6 are diagrams showing the functioning of the video sampling and video modifying circuits of FIG. 3.

Referring now to FIG. 5 in conjunction with FIG. 3, the functioning of the video sampling and video modifying circuits 29, 32 upon encountering the fast-sweep "white" initial video signal 94–3 which is of longer duration than the respective monostable multivibrator pulse 93–3 will be described. The control signal in the output circuit 53 of the white level detector 52 has the same duration as the fast-sweep "white" level initial video sginal 94–3, as shown in FIG. 5B at 94–3C, and the inverted signal provided by inverter 54 is shown at 97 in FIG. 5D. The differentiated leading edge and trailing edge signals 98 and 99 provided by the differentiating and clipping circuit 57 responsive to the leading and trailing edges of the control signal 94–3C are shown in FIG. 5E. It will be seen that the inverted signal 97 and the monstable multivibrator pulse 93–3 are applied to the AND gate 56 and that since the monostable multivibrator pulse 93–3 terminates prior to termination of the control signal 94–3C, no output signal will appear in the output circuit 62 of the AND gate 56.

The shaped control signal 94–3C appearing in the output circuit 80 of the pulse shaper 65 is shown at 94–3S in FIG. 5G and the timing signal 100 provided by the timing circuit 66 is shown in FIG. 5H; it will be seen that the charging capacitor of timing circuit 66 charges up while the shaped pulse 94–3S is applied. When the signal in output circuit 80 of pulse shaper 65 is zero, the charging capacitor discharges to provide the resultant signal 100 having a duration twice that of the control signal 94–3C. The signal 102 provided by the threshold detector 68 and shown in FIG. 5I thus has the same duration as the timing signal 100 and results in the provision of leading and trailing edge differentiated signals 103 and 104 by the differentiating and clipping circuit 69. The positive spike 103 being clipped allowing passage of the negative spike 104.

The leading and trailing edges of the output signal from AND gate 56 are differentiated by the differentiating circuit 61. The bistable multivibrator 64 is "set" by an output signal in the output circuit of the clipping circuit 62 and thus, since under the conditions shown in FIG. 5, no output signal is provided by the AND gate 56 there likewise is no output signal from differentiating circuit 61 and clipping circuit 62, as shown in FIG. 5O. Thus, bistable multivibrator 64 will not be "set" and therefore will not be "reset" by the trailing edge differentiated signal 104 provided by the differentiating and clipping circuit 69. Thus, the output from the bistable multivibrator 64 is at zero level as shown in FIG. 5K, and no signal is applied to the stop sweep switch 23. Likewise, since no output signal is provided in the output circuit 70 of the bistable multivibrator 64, the output circuit 75 of the AND gate 72 does not modify the scanned video signal. The fast-sweep "white" initial video signal 94–3 is thus directly applied to the input circuit of delay line 76, as shown in FIG. 5M and is delayed therein by the time T to provide the delayed signal 94–3D in output circuit 34, as shown in FIG. 5N.

The shaped pulse 94–3S provided by the pulse shaper 65 is applied to the delay line 79 and delayed by the time T as shown at 94–3SD in FIG. 5P. The differentiated leading and trailing edge signals 105, 106 provided by the differentiating and clipping circuit 82 in response to the leading and trailing edges of the delayed pulse 94–3SD are shown in FIG. 5Q. However, since no trailing edge differentiated signal is provided by the differentiating and clipping circuits 61, 63 to "set" bistable multivibrator 78, the trailing edge differentiating signal 106 provided by differentiated and clipping circuit 82 does not "reset" the bistable multivibrator 78 and thus no output signal is provided by bistable multivibrator 78, as shown in FIG. 5R. Thus, output circuit 87 of AND gate 84 does not affect the signal in output circuit 34 with the result that the fast-sweep "white" initial video signal 94–3, delayed by time T by the delay line 76, appears in the output circuit 34 as shown at 94–3D in FIG. 5T.

Figure 6:
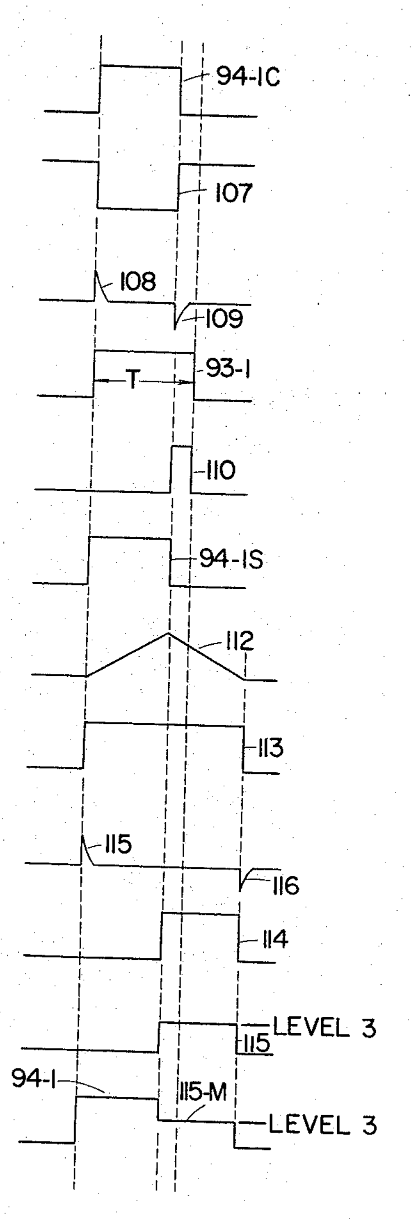
Figure 5:
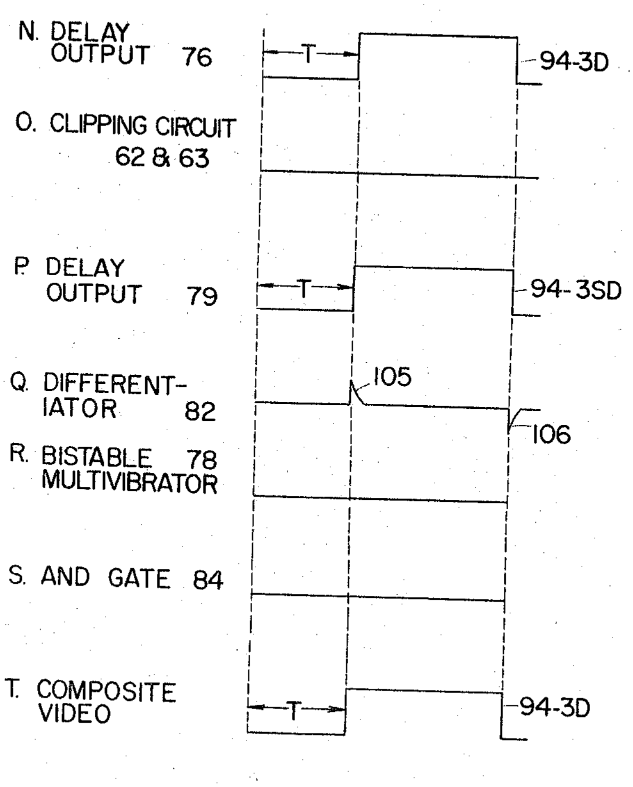
Figure 6:
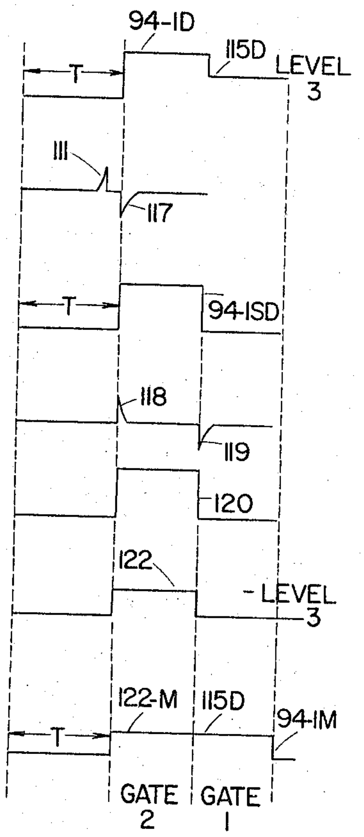

Referring now to FIG. 6, the functioning of the video sampling and video modifying circuits 29, 32 is shown in response to a fast-sweep "white" initial video signal such as 94–1, having a duration shorter than the respective monostable multivibrator pulse 93–1. Here, the control signal provided by the white level detector 52 responsive to the fast-sweep "white" initial video signal 94–1 is shown at 94–1C in FIG. 6B and the inverted version thereof provided by the inverter 54 is shown at 107 in FIG. 6D. The leading and trailing edge differentiated signals 108, 109 provided by differentiating and clipping circuit 57 in response to the leading and trailing edges of the control signal 94–1C are shown in FIG. 6E and the monostable multivibrator pulse 93–1 is shown in FIG. 6C. Here, it will be seen that with the inverted signal 107 from the inverter 54 applied to the AND gate 56 having a duration shorter than the monostable multivibrator signal 93–1 also applied to the AND gate 56 an output pulse 110 will appear in the output circuit of AND gate 56, output pulse 110 having a duration which is the difference between the duration of the inverted signal 107, and thus the duration of the control signal 94–1C and the fast-sweep "white" initial video signal 94–1, and the duration of monostable multivibrator pulse 93–1. The shaped pulse 94–1S provided by the pulse shaper 65 in response to the control signal 94–1C is shown in FIG. 6G, providing inturn timing signal 112 from the timing circuit 66 and threshold signal 113 in response thereto provided by the threshold detector 68, as shown respectively in FIGS. 6H and I.

The output signal 110 appearing in the output circuit of AND gate 56 is differentiated by the differentiating circuit 61 to provide leading and trailing edge differentiated signals 116, 117 as shown in FIG. 6O. The differentiated leading edge signal 116 will "set" bistable multivibrator 64 to initiate pulse 114 in its output circuit 70, as shown in FIG. 6K. The differentiated leading and trailing edge signals 115, 116 provided by the differentiating and clipping circuit 69 in response to the leading and trailing edges of the threshold signal 113 are shown in FIG. 6J, the trailing edge differentiated signal 116 responsive to and coincident with the trailing edge of the threshold signal 113 "RESETTING" bistable multivibrator 64 to terminate the output pulse 114. It will be seen that output pulse 114 has a duration equal to that of the fast-sweep "white" initial video signal 94–1, pulse 114 being applied to the stop-sweep switch 23 to interrupt the sweep, as above described.

The output pulse 114 from the bistable multivibrator 64 is applied to AND gate 72 thus providing in output circuit 75 the fixed direct current potential as shown at 115 in FIG. 6L. It will now be seen, as shown in FIG. 6N that the input signal applied to the delay line 76 is the initial fast-sweep "white" video signal 94–1 which has the first or "whiter-than-white" level, the output circuit 30 then being clamped to the intermediate or third level of source 74, as shown at 115M in FIG. 6M. The output signal from delay line 76 is thus the signal shown in FIG. 6M delayed by time T, as shown at 94–1D and 115D in FIG. 6N. Assuming that the signal is not further modified by AND gate 84.

The differentiated trailing edge signal 117 provided by differentiating and clipping circuits 61, 63 is delayed by time T from the initiation of the fast-sweep "white" signal 94–1. The shaped signal 94–1S provided by the pulse shaper 65 is delayed by the delay line 79 by time T to provide delayed signal 94–1SD as shown in FIG. 6P and the differentiating and clipping circuit 82 provides differentiated leading and trailing signals 118, 119, respectively responsive to the leading and trailing edges of the delayed shaped pulse 94–1SD as shown in FIG. 6Q. The differentiated trailing edge signal 117 provided by the differentiating circuit 61 and clipping circuit 63 in response to the trailing edge of the pulse 110 from the AND gate 56 "sets" bistable multivibrator 78 to initiate pulse 120 in its output circuit 83, the differentiated trailing edge signal 119 provided by the differentiating clipping circuit 82 "resetting" bistable multivibrator 78 to terminate pulse 120, as shown in FIG. 6R. Inspection of FIG. 6 will reveal that the pulse 120 provided by bistable multivibrator 78 has the same duration as the fast-sweep "white" video signal 94–1 but delayed by time T therefrom.

Application of the pulse 120 from the bistable multivibrator 78 to the AND gate 84 gates the potential of source 86 to output circuit 87, as shown at 122 in FIG. 6S. Recalling now that the signal 94–1D, 115D would appear in the output circuit 34 of delay line 76 in the absence of a signal in output circuit 87 of AND circuit 84, and observing that the fixed level of direct current potential signal 122 which does appear in output circuit 87 of AND circuit 84 is coincident with the delayed signal 94–1D, it will be seen that the output circuit 34 is clamped to the potential of source 86 during signal 122 with the result that a composite modified video signal 94–1M appears in output circuit 34, as shown in FIG. 6T, signal 94–1M having the level of sources 74, 86, i.e., a level intermediate "black" level 90 and the fast-sweep "white" level 94, and having a duration twice the duration of the fast-sweep "white" initial video signal 94–1; the modified video signal 94–1M is composed of the clamping signals 122M and 115D each of which has the same duration as the fast-sweep "white" initial video signal 94–1, as above described.

It will now be seen that when a fast-sweep "white" initial video signal, such as 94–1, is sensed which has a duration shorter than that of the duration T of the monostable multivibrator pulse 93–1, a stop-sweep pulse 114 is generated having the same duration as the shorter fast-sweep "white" initial video signal 94–1 and which actuates the stop-sweep switch 23 to interrupt the sweep, and that the shorter fast-sweep "white" initial video signal 94–1 is modified to provide video signal 94–1M having a third level intermediate the "white" level 94 and the "black" level 96 and having a duration twice that of the shorter fast-sweep "white" initial video signal 94–1, i.e., the same duration as that which would be provided if the scanning line section 89–1 had initially been scanned at the normal or slow rate.

Figure 7:
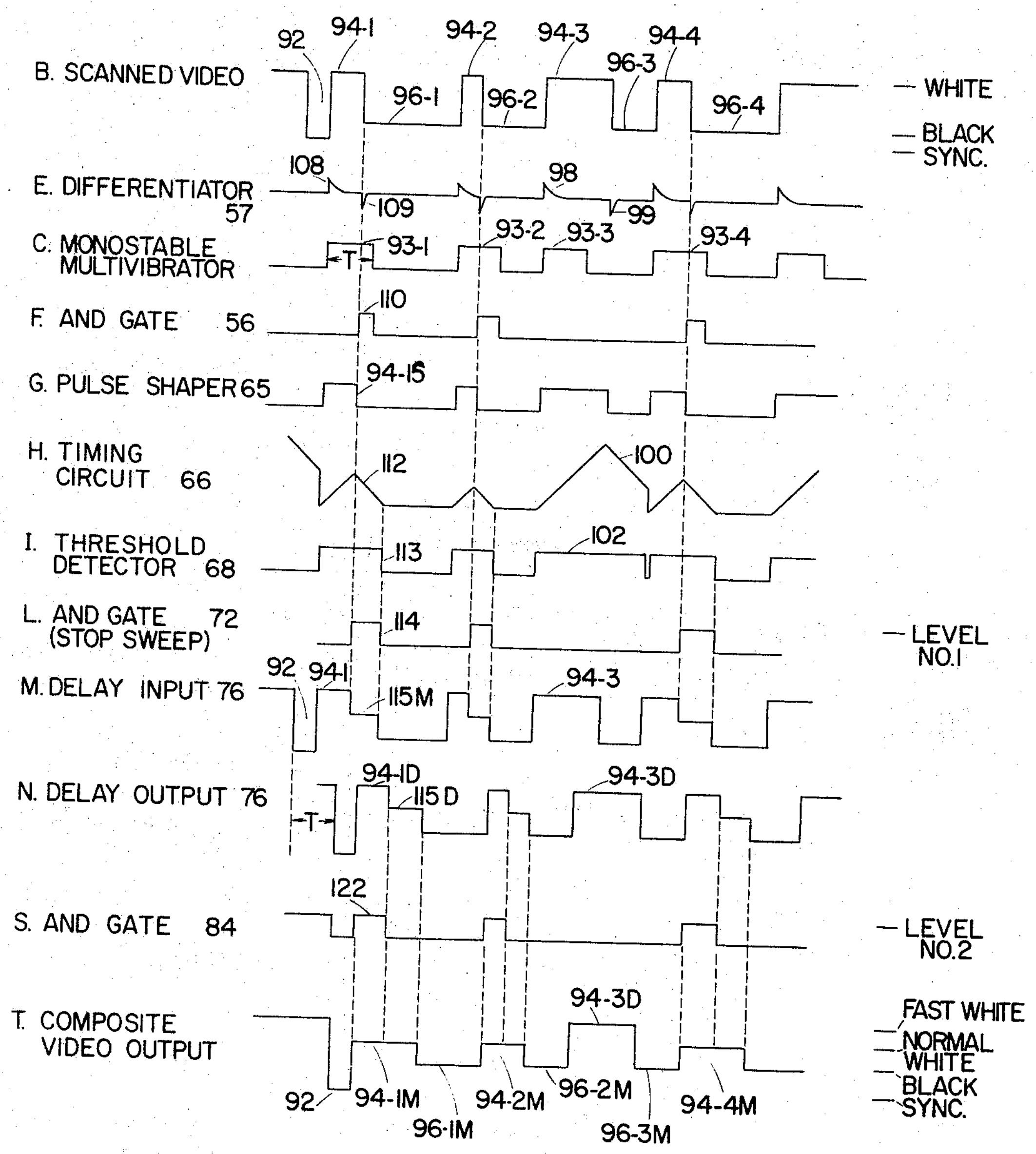
FIG. 7 is a diagram showing the signals provided in the embodiment of FIG. 3 during a typical scanning line.
Figure 7:
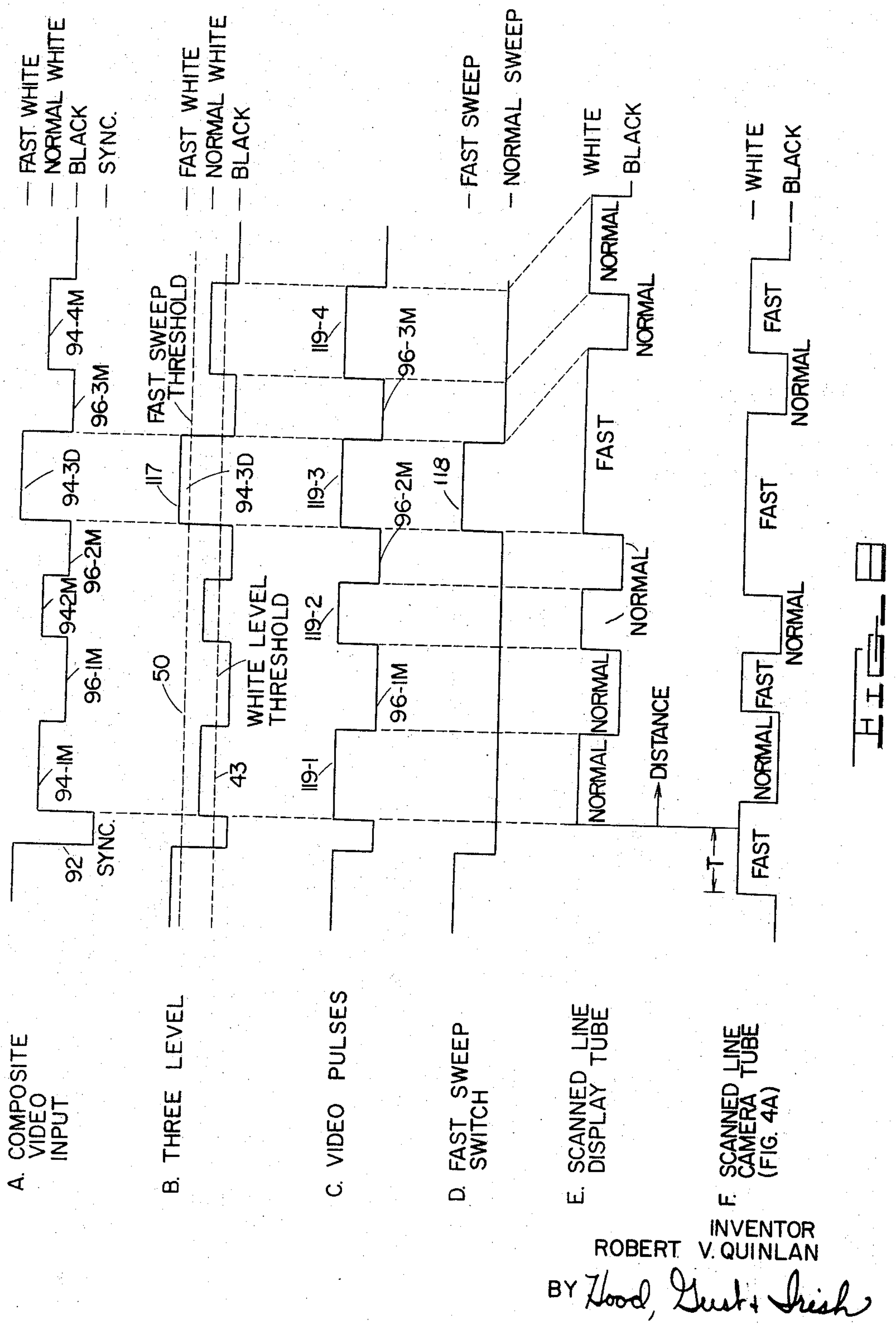

Referring now to FIG. 7, there is shown in FIG. 7B the same initial scanned video signal as that shown in FIG. 4B. The leading edge differentiated signals provided by the differentiating and clipping circuit 57 are shown in FIG. 7E and the monostable multivibrator pulses 93 are shown in FIG. 7C. The signals 110 provided in the output circuit 62 of the AND gate 56 in response to fast-sweep "white" initial video signals respectively having durations shorter than the monostable multivibrator pulses 93 are shown in FIG. 7F, the shaped pulse 94–S provided by the pulse shaper 65 are shown in FIG. 7G, and the timing signals provided by the timing circuit 66 is response to the shaped pulses 94–S are shown in FIG. 7H. The resultant threshold signals are shown in FIG. 7I and the stop sweep pulses 114 are shown in FIG. 7L. The signal input to the delay line 76 is shown in FIG. 7M and the signal output of delay line 76 (in the absence of clamping thereof by the output signal from AND gate 84) is shown in FIG. 7N. Finally, the clamping signal provided by AND gate 84 is shown in FIG. 7S and the resultant composite video signal appearing in output circuit 84 is shown in FIG. 7T. It is thus seen that the composite video signal shown in FIG. 7T resulting from the scanned initial video signal shown in FIG. 7B comprises a fourth level synchronizing signal 92, third level normal-sweep "white" video signal 94–1M corresponding to fast-sweep "white" video signal 94–1, second level "black" video signal 96–1M corresponding to "black" initial video signal 96–1, third level normal-sweep "white" video signal 94–2M corresponding to fast-sweep initial video signal 94–2, "black" level video signal 96–2M corresponding to "black" initial video signal 96–2, first level fast-sweep "white" video signal 94–3D corresponding to fast-sweep "white" initial video signal 94–3, second level "black" video signal 96–3M corresponding to "black" initial video signal 96–3, and third level normal-sweep "white" video signal 94–4M corresponding to fast-sweep "white" initial video signal 94–4.

It will be seen that the composite video output signal as shown in FIG. 7T, comprises four levels, i.e., a first or fast-sweep "white" level, a second or normal sweep "black" level, a third or normal-sweep "white" level and a fourth sync. level. It will further be seen that the requirement of the system is that a "stop sweep" signal 114 be provided having a duration which when added to the duration of a fast-sweep "white" initial video signal which is shorter than the predetermined time T, bears the same relation to the shorter fast-sweep "white" initial video signal as the relation of the fast scanning rate to the slow scanning rate, and that the shorter fast-sweep "white" initial video signal be modified to provide a third level video signal having a duration equal to that of the shorter fast-sweep "white" initial video signal plus the "stop sweep" signal. It will be understood that in the embodiment illustrated in FIG. 3, the fast scannning rate has a 2:1 relationship to the slow scanning rate and thus the "stop sweep" pulse 114 is equal in duration to a shorter fast-sweep "white" initial video signal and the resultant third level normal-sweep "white" video signal has a duration twice that of a respective shorter fast-sweep "white" initial video signal.

Referring now to FIG. 8 in conjunction with FIGS. 2 and 7, FIG. 8 shows the same composite video signal received at the receiving station 35 as that transmitted from the transmitting station 20 and shown in FIG. 7T. The sync. stripper circuit 36 separates the synchronizing signals 92 from the remaining video signals in conventional fashion with the result that a three level video signal as shown in FIG. 8B appears in output circuit 39 of the sync. stripper circuit 36.

The fast-normal level detector circuit 49 is set to have a threshold level to detect the fast-sweep "white" video signals, as shown by the dashed line 50 in FIG. 8B. It will be seen that the fast-sweep "white" signal 94–3D, being at the first level, exceeds threshold level 50 provided by the fast-normal level detector 49, as at 117, and a fast sweep pulse 118, as shown in FIG. 8D, is thus provided which actuates the fast-sweep switch 45 to couple the fast-sweep timing circuit 46 to the deflection elements 48 of the display tube 40.

The video pulse generator circuit 42 is set to have a threshold level to detect all "white" video signals, both normal-sweep and fast-sweep, as shown by the dashed line 43 in FIGS. 2 and 8B. Thus, all of the normal-sweep "white" and fast-sweep "white" video signals in the three level video signal will exceed threshold level 43, to provide respective "white" video pulses 119–1, 119–2, 119–3, and 119–4 as shown in FIG. 8C.

The fast-normal sweep switch 45 couples the normal-sweep timing circuit 47 to deflection elements 48 of the display tube 40 in the absence of a fast-sweep signal 118, and thus the beam in the display tube 40 will be scanned at the normal or slow rate during the occurrence of "white" video signals 119–1 and 119–2 and "black" signals 96–1M and 96–2M. Upon the occurrence of the "fast sweep" signal 118, fast sweep switch 45 is actuated to couple the fast-sweep timing circuit 46 to the deflection of element 48 thereby to provide the fast scanning rate, the fast-sweep switch 45 again connecting the normal sweep timing circuit 47 to the deflection elements 48 during the occurrence of "black" signal 96–3M and "white" signal 119–4 to provide the scanned line on the display tube as shown in FIG. 8E. Referring now to FIG. 8F and also to FIG. 4A, it will be seen that the resultant scanned line shown in FIG. 8E duplicates the scanned line in the camera tube 21, being delayed in time by delay T. However, it will be seen that the video signals generated in the transmission station 20 as above-described which cause reproduction of the scanned line on the display tube 40 were transmitted in appreciably less time than would have been required if scanning at the uniform rate had been employed, that rate being sufficiently slow to permit transmission of the video signals over narrow band transmission facilities.

It is important that both the camera tube 21 and the display tube 40 sweep at the same rate. The scanning spot contains both vertical and horizontal components and thus, if as in the system of the invention, the horizontal scanning rate is increased, the vertical scanning rate must be proportionately increased; and if this ratio is not kept constant, spacing between adjacent lines will vary. For example, if only the horizontal sweep is increased, the spacing between adjacent scanning lines will be smallest in the picture area containing the least detail which would present maximum vertical resolution where it is least needed. Thus, to maintain a constant horizontal-to-vertical ratio, the sweep waveforms must be controlled together.

Figure 9:
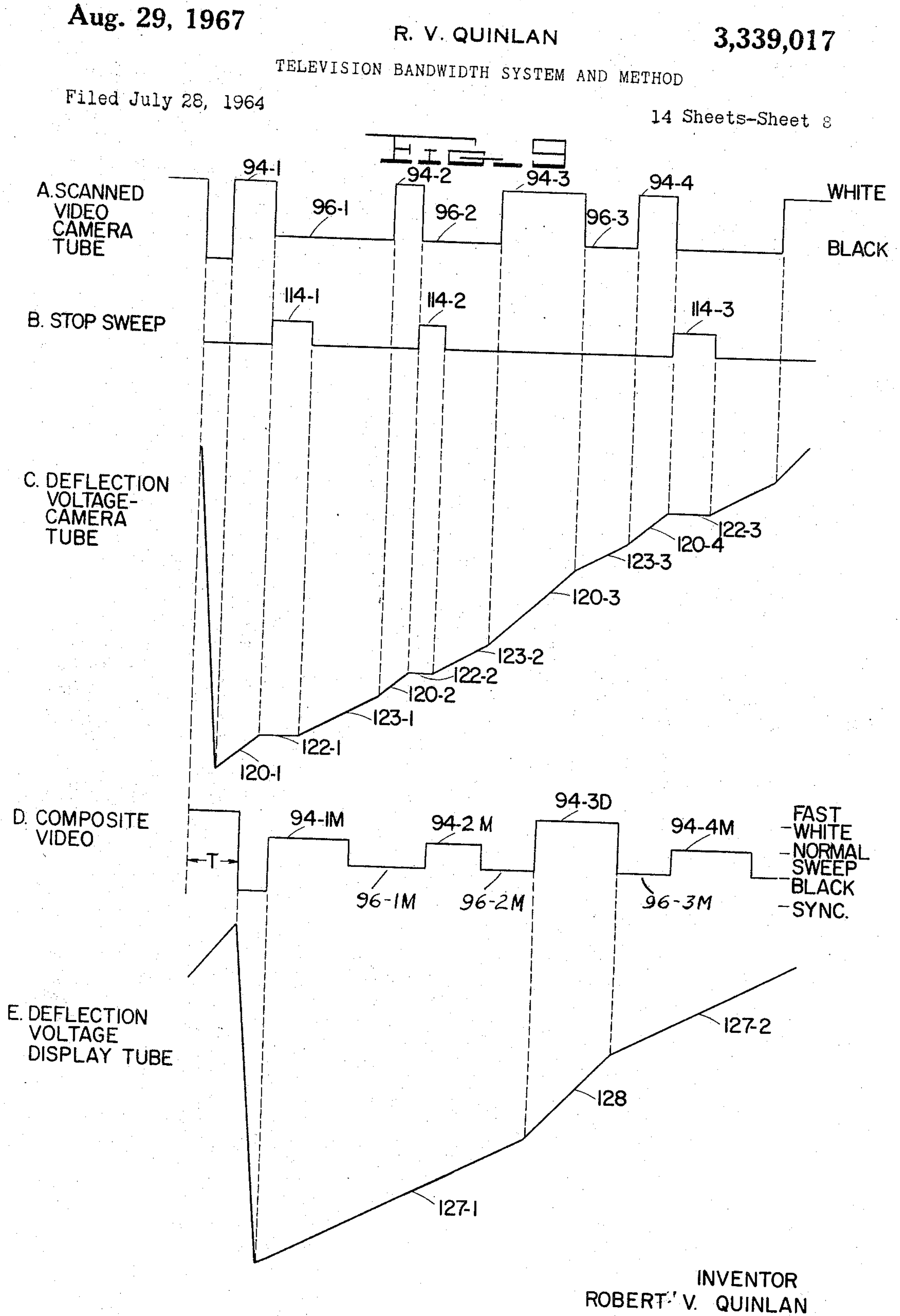
FIG. 9 is a diagram showing deflection voltages provided in the camera tube and image tube, respectively, during a typical scanning line.

Referring now to FIG. 9, there is shown in FIG. 9A the same scanned video signal shown in FIG. 7B with the resultant "stop-sweep" signals 114 being shown in FIG. 9B, which thus corresponds to FIG. 7L. A deflection voltage for the scanned video signal shown in FIG. 9A and the stop-sweep signals shown in FIG. 9B is shown in FIG. 9C, it being understood that this waveform would apply to both the horizontal and vertical sweep circuits for the camera tube 21. Here, it is seen that the beam is scanned at the first rate shown by the slopes 120–1, 120–2, 120–3, and 120–4 during the fast-sweep "white" initial video signals 94–1, 94–2, 94–3 and 94–4 that deflection is interrupted during the "stop sweep" signals 114–1, 114–2, and 114–3 as shown at 122–1, 122–2, and 122–3, and that the beam is scanned at the normal or slow rate as shown by the slopes 123–1, 123–2 and 123–3 during the remaining intervals of the "black" initial video signals 96–1, 96–2 and 96–3.

Figure 10:
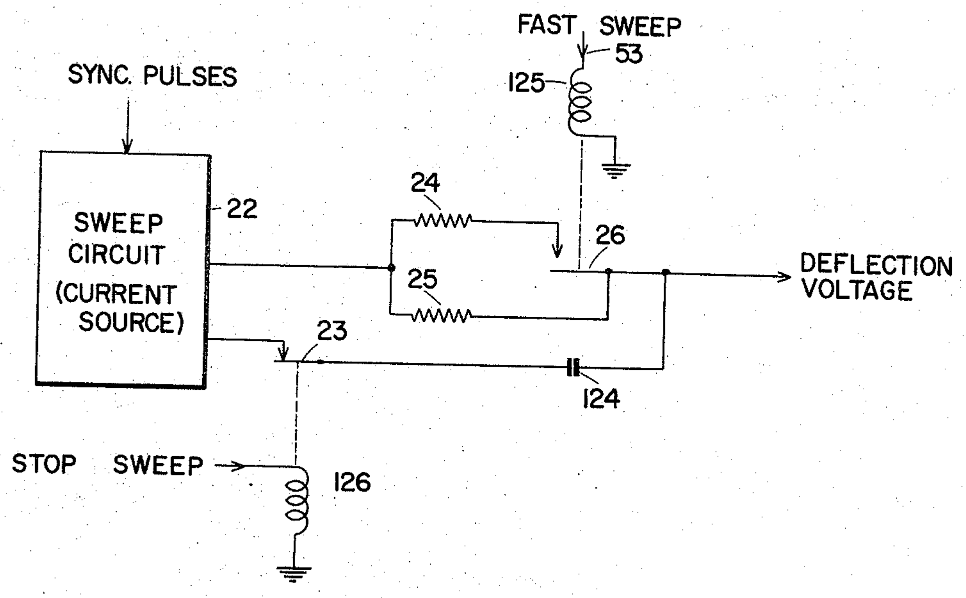
FIG. 10 is a schematic diagram showing the fast-sweep switch employed in both the transmitting and receiving stations.

The generation of the waveform shown in FIG. 9C is readily obtained by changing the time constant in the sweep circuit. Referring to FIG. 10, the fast and normal sweep timing circuits 24, 25 are shown as being timing resistors respectively cooperating with timing capacitor 124 to provide the respective fast and slow sweep rates. The fast sweep switch 26 is actuated by a suitable relay, such as a reed relay 125 energized by output circuit 53 of the video sampling circuit 29. Thus, during intervals of normal or slow-sweep, resistor 24 is disconnected and capacitor 124 charges through resistor 25 to provide the normal or slow sweep rate. A fast-sweep signal, however, detected by the white level detector 52 (FIG. 3) energizes relay 125 to close fast-sweep switch 26 thus connecting the two resistors 24, 25 in parallel to provide the fast sweep. It will be seen that the stop switch 23 is actuated by another suitable relay 126, such as a reed relay energized by the stop sweep signals 114. Energization of the relay 126 by a stop sweep signal 114 opens stop sweep switch 123 thereby disconnecting charging capacitor 124 from the charging circuit to interrupt the sweep. It will be readily understood that separate circuits as shown in FIG. 10 would be employed for both the vertical and horizontal sweeps with appropriate differences in the values of the resistor 24, 25 and capacitor 124, the fast sweep switches 26 and the stop sweep switches 23, however, being respectively simultaneously actuated in response to the fast sweep and stop sweep signals. It will be readily understood that the circuitry shown in FIG. 10 is illustrative only and that other circuits may be employed for providing the fast and slow sweeps.

Referring to FIG. 9D, there is shown the same composite received video signal as that shown in FIG. 8A, and the corresponding deflection voltage for the display tube 40 is shown in FIG. 9E, it again being understood that this waveform will apply to both the horizontal and vertical sweep circuits. Here, it will be seen that the beam in the display tube 40 is scanned at the normal or slow rate identical to the normal or slow rate sweep in the camera tube 21 during the occurrence of the normal-sweep "white" video signals 94–1M, 94–2M and 94–4M and during the "black" video signals 96–1M, 96–2M and 96–3M, as shown by the slopes 127–1 and 127–2. However, upon detection of the fast sweep "white" video signal 94–3D by the fast-normal detector 49, fast sweep switch 45 is actuated to couple the fast sweep timing circuit 46 to deflection elements 48 of the display tube 40 thereby to provide the fast sweep rate as shown by the slope 128 in FIG. 9E. It will be readily understood that the fast and slow sweep timing circuits 46, 47 for the display tube 40 may be identical to the fast and slow sweep timing circuits 24, 25 for the camera tube 21, the stop sweep switch 23 of course being eliminated since there is no interruption of the sweep in the display tube 40. It will further be understood that the fast and slow sweep circuitry shown in FIG. 10 is for illustrative purposes only, and that other circuits well known to those skilled in the art for providing the requisite fast and slow sweeps may be employed.

It will be understood that in the system of the invention, it is imperative that the sweeps for the camera tube 21 and the display tube 40 be synchronized. Since in this system, the time between synchronizing signals will vary, depending upon the type of copy transmitted, i.e., an all white line would be transmitted twice as rapidly as an all black line, employment of local synchronized oscillators is not possible, and synchronizing pulses must be transmitted accurately for controlling both the horizontal and vertical sweeps. This may readily be accomplished by employment of fourth level synchronizing pulses, as above described, however, this requires an increase in the signal-to-noise ratio for an equivalent channel capacity, and it is therefore desirable to provide for synchronizing signals which will utilize the same three levels which are employed for the video signals.

Figure 11:
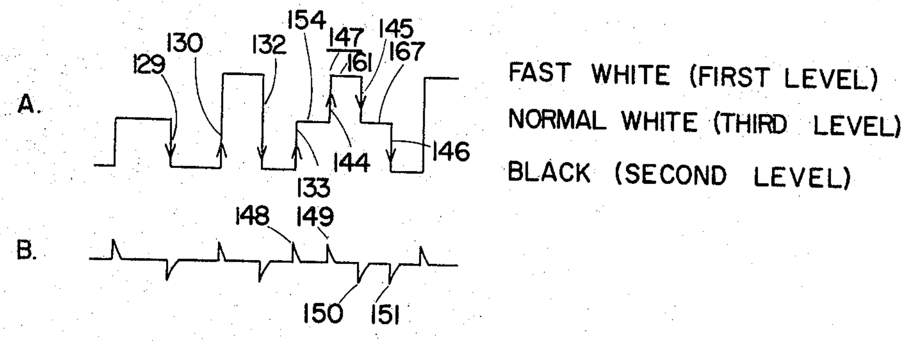
FIG. 11 is a diagram showing the coding of synchronizing signals onto three levels.

An examination of the transmitted and received video waveforms shown in FIG. 7T and FIG. 8A reveals that there are only three transitions in signal level which occur during normal transmission of video signals, i.e., normal-sweep "white" to "black," as shown at 129 in FIG. 11A, "black" to fast-sweep "white" as shown at 130 in FIG. 11A, and fast-sweep "white" to "black," as shown at 132 in FIG. 11A. Examination of FIG. 7T, FIG. 8A and FIG. 11 will further reveal that there are four transitions in signal level which do not occur during normal video signal transmission, i.e., "black" to normal-sweep "white" immediately followed by normal-sweep "white" to fast-sweep "white" as shown at 133 and 144 in FIG. 11A, and the reverse, i.e., fast-sweep "white" to normal-sweep "white" immediately followed by normal-sweep "white"

to "black" as shown at 145 and 146 in FIG. 11A. Thus, transmission of synchronizing signals on three levels may be provided by coding the synchronizing signals employing the above-described unused transitions. Thus, if a synchronizing signal is employed to generate a pulse as shown at 147 in FIG. 11A made up of the four transitions 133, 144, 145 and 146, and this pulse is differentiated at the receiving station 35, it will be seen that a pair of positive-going differentiated signals 148, 149 immediately followed by a pair of negative-going differentiated signals 150, 151 will be provided which can be employed to recognize a synchronizing pulse 147 and to provide a synchronizing signal in response thereto.

Figure 12:
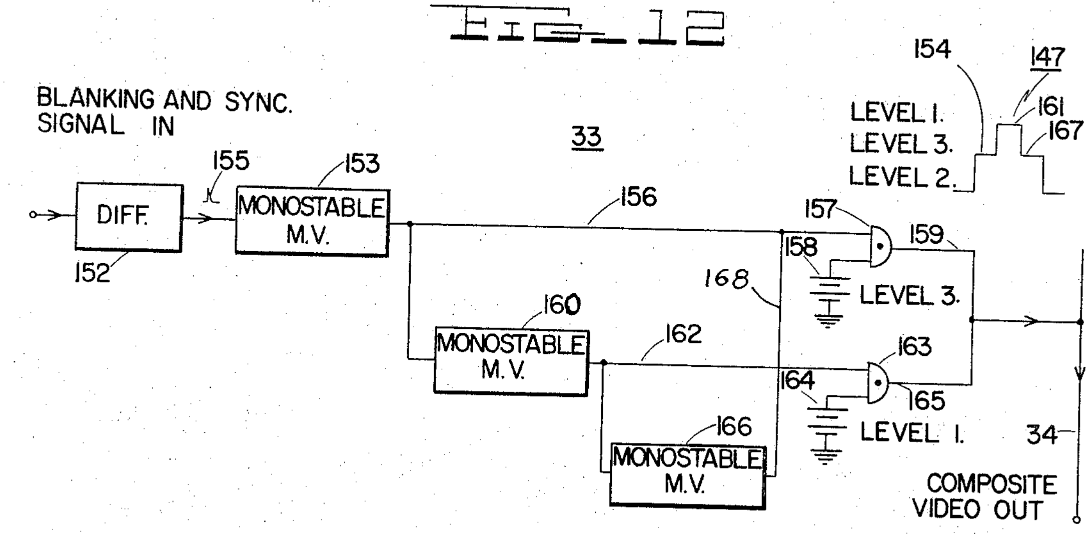
FIG. 12 is a schematic diagram showing the synchronizing signal encoder for providing the coded synchronizing signals of FIG. 11.

Referring now to FIG. 12, a suitable circuit is shown for the encoder 33 of FIG. 1 which will generate the coded synchronizing pulse 147 of FIG. 11A in response to a synchronizing signal. Here, a conventional differentiating circuit 152 is provided coupled to a conventional monostable multivibrator 153 which generates a pulse having the duration of the third level pulse 154 of the coded synchronizing pulse 147 in response to leading edge differentiated signal 155. Output circuit 156 of monostable multivibrator 153 is coupled to AND gate 157 which has its other input circuit coupled to a fixed source 158 of direct current potential having the third level, i.e., the level of pulse 154. The output circuit 159 of AND gate 157 is coupled to output circuit 34. Thus, generation of the pulse by the monostable multivibrator 153 will result in the output circuit 34 being clamped to the third level potential source 158 to provide the third level pulse 154 of the coded synchronizing pulse 147.

Another monostable multivibrator 160 is provided coupled to output circuit 156 of monostable multivibrator 153 and generating a pulse in response to the trailing edge of the pulse generated by the monostable multivibrator 153. Monostable multivibrator 160 has its output circuit 162 coupled to AND gate 163 which has its other input circuit coupled to a fixed source 164 of direct current potential having the first level pulse 161. AND gate 163 has its output circuit 165 connected to output circuit 34. Thus, generation of the pulse by monostable multivibrator 160 in response to termination of the pulse generated by monostable multivibrator 153 will cause the output circuit 34 to be clamped to the first level potential of source 164 thus providing the first level pulse 161 of the coded synchronizing pulse 147.

A third monostable multivibrator 166 is provided coupled to output circuit 162 of monostable multivibrator 160 and generating a pulse in response to termination of pulse generated by monostable multivibrator 160. Monostable multivibrator 166 has its output circuit 168 coupled to output circuit 156 of monostable multivibrator 153 and to AND gate 157. Thus, upon termination of the pulse provided by monostable multivibrator 160 which provided the first level pulse 161 of the coded synchronizing pulse 147, monostable multivibrator 166 will generate a pulse which will cause the output circuit 34 again to be clamped to the level of source 158 thus providing the third level pulse 167 of the coded synchronizing pulse 147.

Figure 13:
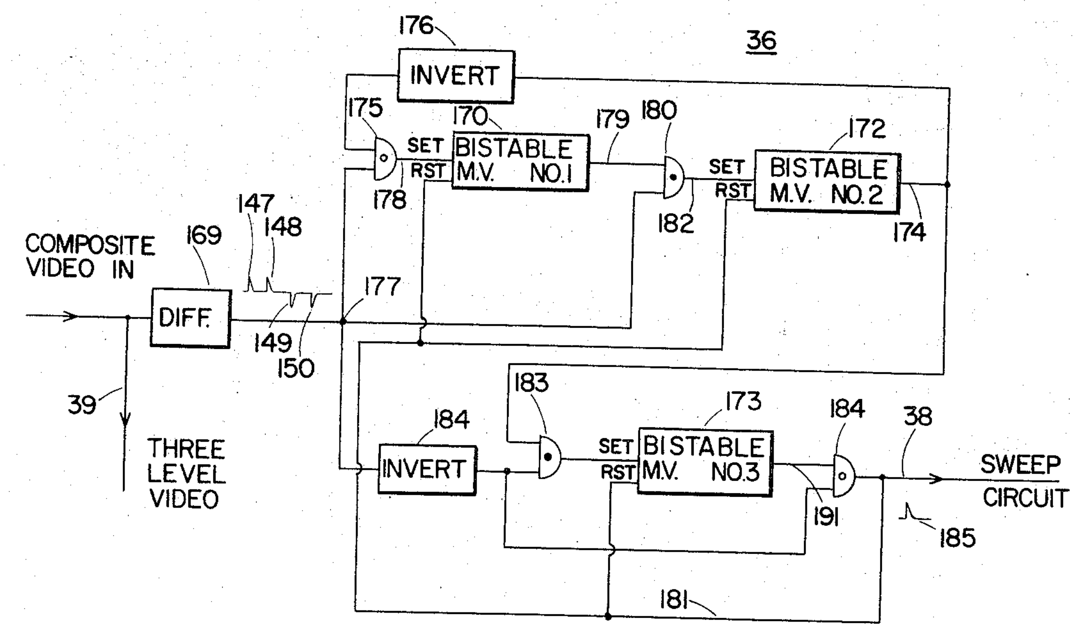
FIG. 13 is a schematic block diagram showing a synchronizing signal decoded or "sync. stripper" employed for decoding the coded synchronizing signals of FIG. 11.

Referring now to FIG. 13, a suitable circuit is illustrated for the sync. stripper circuit 36 of FIG. 2 for decoding the coded synchronizing pulses 147. Here, conventional differentiating circuit 169 differentiates the received video signal and the coded synchronizing signal 147 providing differentiated signals 147, 148, 149 and 150 as shown in FIG. 11. Here, three bistable multivibrators 170, 172, and 173 are provided, each normally having zero output. Bistable multivibrator 172 has its output circuit 174 coupled to AND gate 175 by inverter 176, AND gate 175 having its other input circuit coupled to output circuit 177 of the differentiating circuit 169 and having its output circuit 178 coupled to bistable multivibrator 170. Thus, it will be seen that the first positive-going differentiated signal 147 will enable AND gate 175 in turn providing an output signal from bistable multivibrator 170 which has its output circuit 179 coupled to AND gate 180. AND gate 180 has its other input circuit coupled to output circuit 177 of differentiating circuit 169 and its output circuit 182 coupled to bistable multivibrator 172. Thus, it will be seen that the second positive-going differentiated signal 148 will enable AND gate 180 and produce an output from bistable multivibrator 172. The output from bistable multivibrator 172 disables AND gate 175, but enables AND gate 183 to which it is also coupled, as shown. The other input circuit of AND gate 183 is coupled to output circuit 177 of differentiating circuit 169 by conventional inverter 184 and thus, the first negative-going differentiated signal 149 is applied to bistable multivibrator 173 to provide an output therefrom which is applied to AND gate 184 to enable the same. The other input circuit of AND gate 184 is coupled to inverter 184 and thus the second and final negative-going differentiated signal 150 is applied to AND gate 184 to provide synchronizing signal 185 as an output in output circuit 38 which triggers the retrace and sweep circuitry, as is well known to those skilled in the art. Signal 185 which also appears on circuit 181, resets bistable multivibrators 170, 172, 173 to their initial condition of zero outputs at 174, 179, 191.

Figure 14:
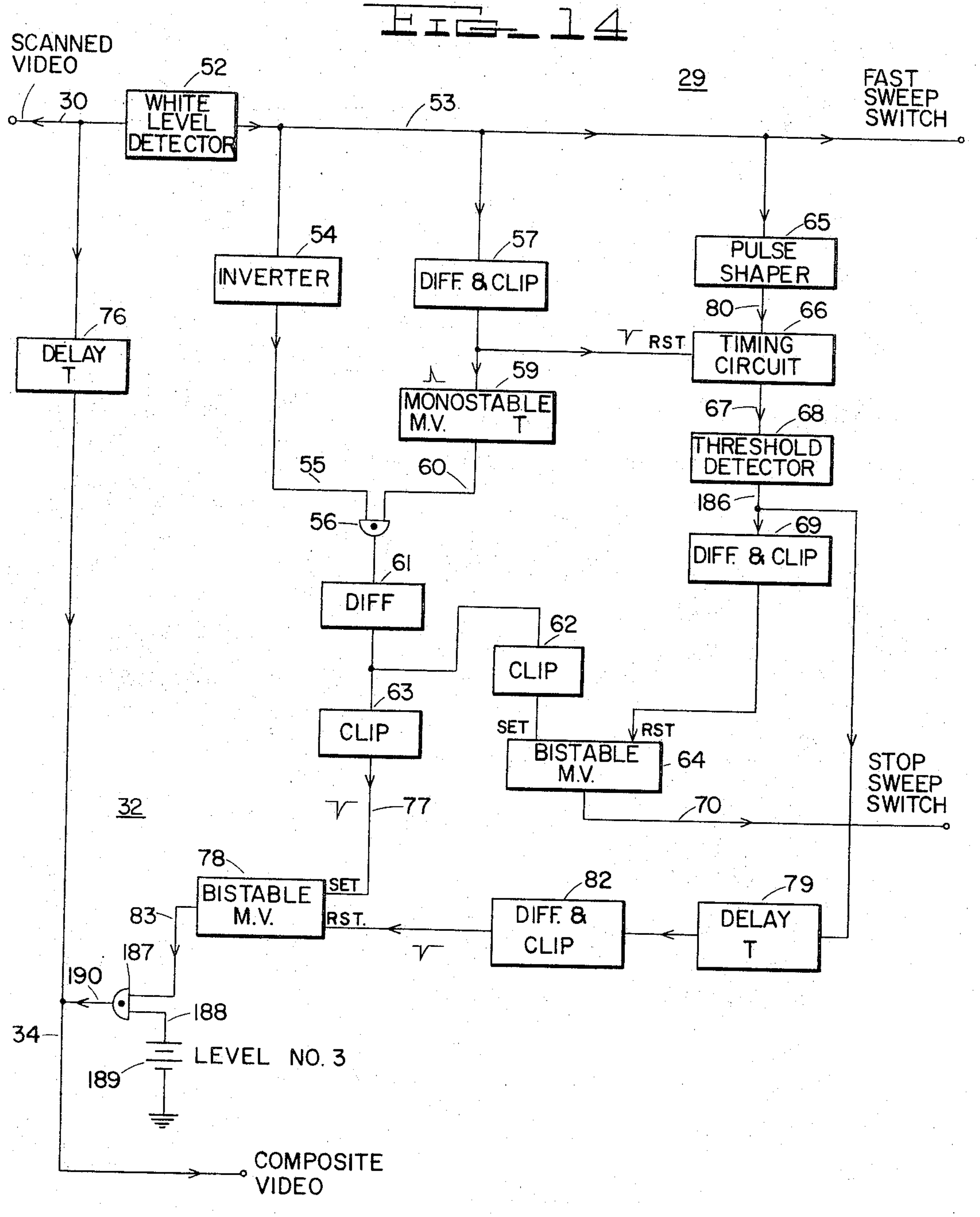
FIG. 14 is a schematic block diagram showing a modified form of video modifying circuit.

Referring now to FIG. 14 in which like elements are indicated by like reference numerals, a modified form of video sampling and video modifying circuits 29, 32 is shown. Here, delay line 79 is coupled to output circuit 186 of threshold detector 68 rather than to output circuit 80 of shaper 65 as in the embodiment of FIG. 3, and thus delays the entire threshold signal by the delay T. Delay line 79 is again coupled to differentiating and clipping circuit 82 which in turn is coupled to the "RESET" circuit of bistable multivibrator 78. The output circuit 83 of bistable multivibrator 78 is coupled to AND gate 187 which has its other input circuit 188 coupled to a fixed source 189 of direct current potential having the third level, and the output circuit 190 of AND gate 187 is coupled to output circuit 34.

Figure 15:
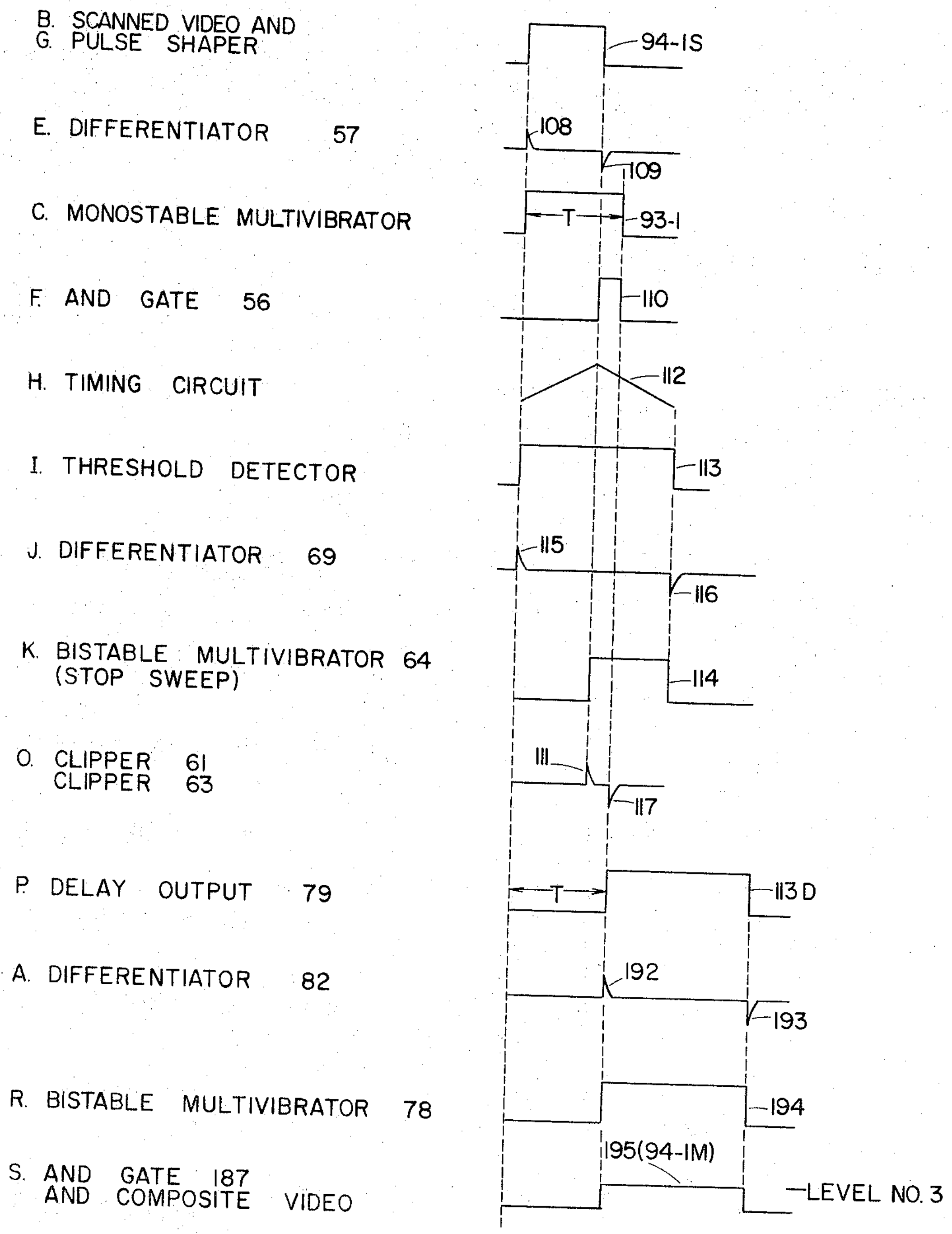
FIG. 15 is a diagram showing the signals provided in the system of FIG. 14.

Referring now to FIG. 15 in which like signals are indicated by the same reference numerals as applied in FIG. 6, and which shows the signals found in the circuit of FIG. 14 upon the occurrence of a fast-sweep initial "white" video signal 94–1 having a duration shorter than the respective pulse 93–1 provided by monostable multivibrator 59, it will be seen that the stop sweep signal 114 is generated in exactly the same manner as in the embodiment of FIG. 3. It is seen, however, that the threshold signal 113 is delayed by time T by the delay line 79 to provide delayed threshold signal 113D which has its leading and trailing edges differentiated by the differentiating clipping circuit 82 to provide leading and trailing differentiated signals 192 and 193. It is seen that the trailing edge differentiated signal 117 provided by the differentiating and clipping circuits 61, 63 in response to the trailing edge of the pulse 110 "sets" bistable multivibrator 78 whereas the differentiated trailing edge signal 193 responsive to the trailing edge of the delayed threshold signal 113D resets bistable multivibrator 78 thereby to generate pulse 194. It will be seen that pulse 194 generated by bistable multivibrator 78 has the same duration as the threshold signal 113, but is generated only in the event that the fast-sweep "white" initial video signal 94–1 has a duration shorter than the respective timing pulse 93–1 thereby to provide the pulse 110. Application of the bistable multivibrator pulse 194 to AND gate 187 enables the same thereby clamping output circuit 34 to the third level potential of source 189, as shown at 195 in FIGS. 15S and T. It will be seen that the third level signal 195 has the same duration and level as the modified video signal 94–1M of FIG. 6.

Figure 16:
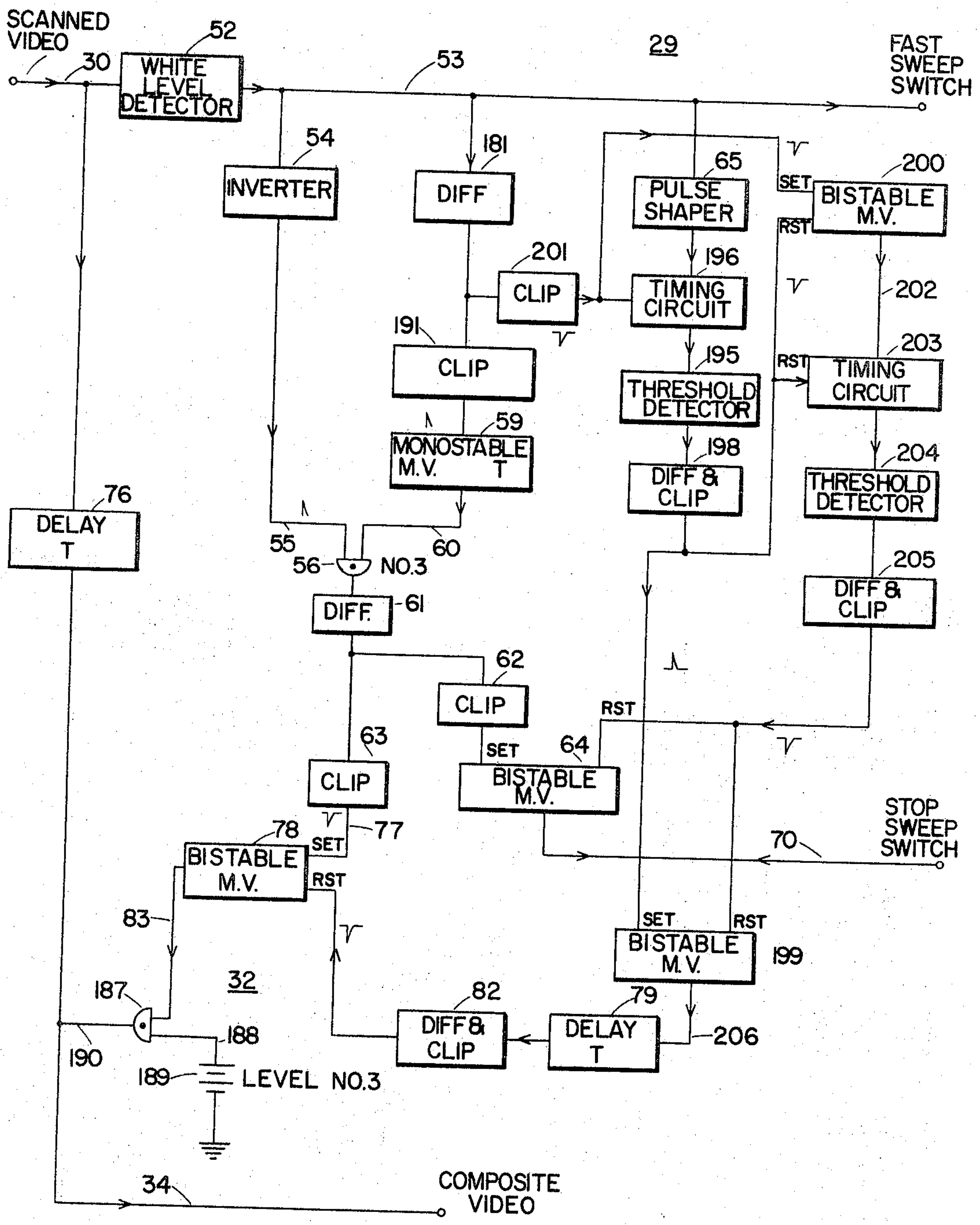
FIG. 16 is a schematic block diagram showing another modified form of video modifying circuit for providing a 3:1 compression.

Referring now to FIG. 16 in which the same reference numerals are employed for like elements as in FIGS. 3 and 14, there is shown a modification of the video sampling and video modifying circuits 29, 32 to accommodate a 3:1 ratio between the fast and slow scanning rates. Here, differentiator 181 is coupled to output circuit 53 and has leading and trailing edge clipping circuits 191, 201 coupled thereto monostable multivibrator 59 being coupled to clipping circuit 191, as shown. Timing circuit 196, which may be identical to timing circuit 66 of the previous figures, is coupled to the pulse shaper 65 and to the clipping circuit 201 to generate a first timing signal having a duration twice that of the shaped pulse provided by pulse shaper 65. Threshold detector 197 is coupled to the timing circuit 196 to generate a corresponding threshold signal and differentiating and clipping signal 198 is coupled to threshold detector 197 to provide differentiated leading and trailing edge signals in response to the leading and trailing edges of the threshold signal provided by the threshold detector 197. Bistable multivibrator 199 is provided having its "set" circuit coupled to differentiating and clipping circuit 198 so that the differentiated leading edge signal provided thereby sets bistable multivibrator 199.

Another bistable multivibrator 200 is provided having its "SET" circuit coupled to clipping circuit 201, bistable multivibrator 200 being "set" by the differentiated trailing edge signal provided by clipping circuit 201. The "RESET" circuit of bistable multivibrator 200 is coupled to differentiating and clipping circuit 198, bistable multivibrator 200 being reset by the differentiated trailing edge signal provided by the differentiating and clipping circuit 198. Bistable multivibrator 200 has its output circuit 202 coupled to another timing circuit 203, which may be identical to timing circuit 196, timing circuit 203 having its "RESET" circuit coupled to differentiating and clipping circuit 198 so as to be "reset" by the differentiated trailing edge signal provided thereby. Timing circuit 203 thus generates a timing signal having twice the duration of the pulse provided by bistable multivibrator 200. Timing circuit 203 is coupled to another threshold detector 204 which generates a corresponding threshold signal which is differentiated by differentiating and clipping circuit 205. Differentiating and clipping circuit 205 is coupled to the "RESET" circuit of bistable multivibrator 64 and to the "RESET" circuit of bistable multivibrator 199. The differentiated trailing edge signal provided by differentiating and clipping circuit 205 thus resets bistable multivibrator 64 to terminate the "stop sweep" pulse and also "RESETS" bistable multivibrator 199 to terminate the pulse generated thereby. Bistable multivibrator 199 has its output circuit 206 coupled to delay line 79 which in turn is coupled to the "RESET" circuit of bistable multivibrator 78 by differentiating and clipping circuit 82.

Figure 17:
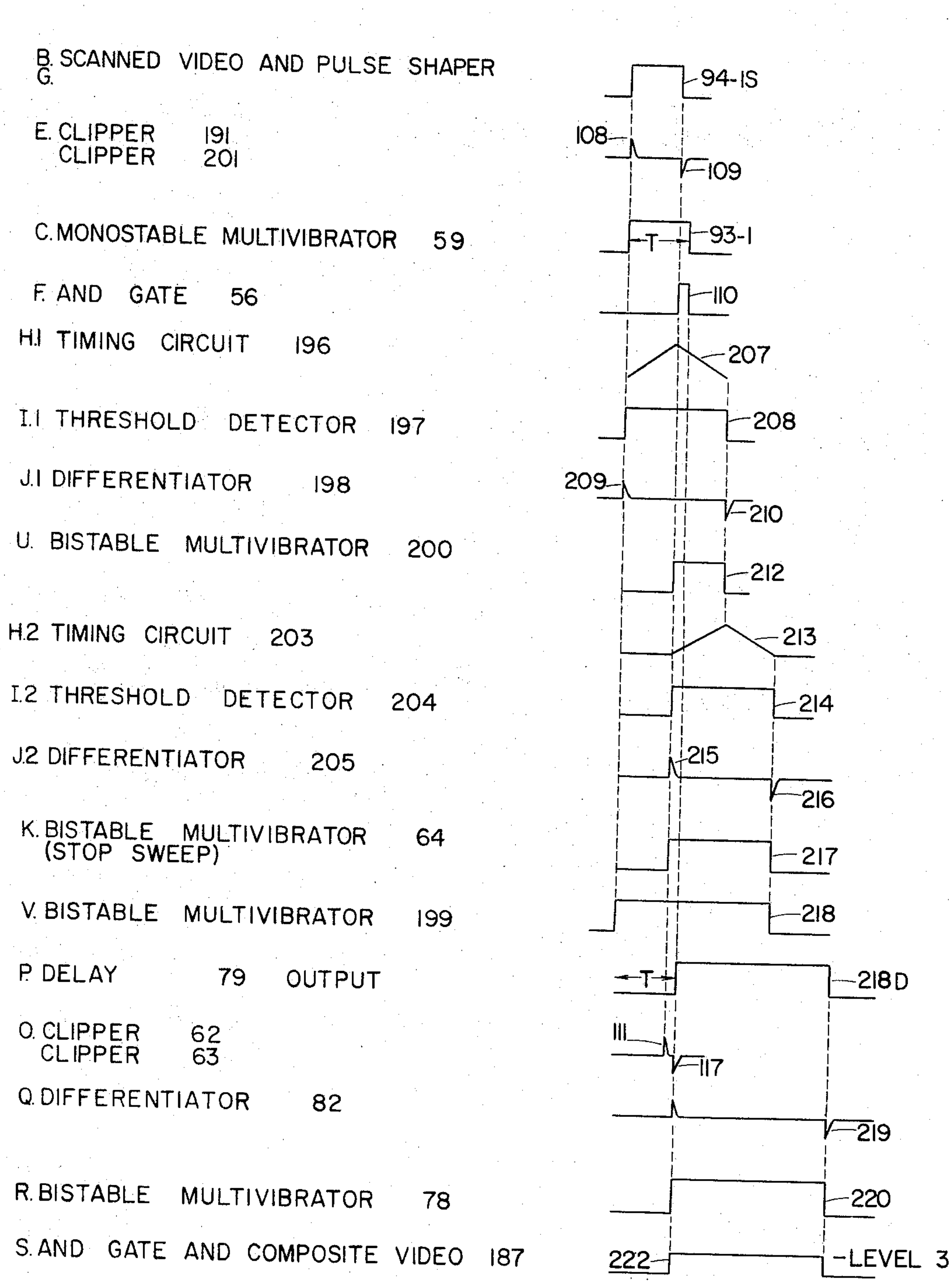
FIG. 17 is a diagram showing the signals provided in the system of FIG. 16.

Referring now to FIG. 17 in which the various signals bear the same reference numerals as applied in FIG. 15, and which shows the signals found in the circuit of FIG. 16 upon the occurrence of a fast-sweep "white" initial video signal 94–1 having a duration shorter than the duration of the respective monostable multivibrator pulse 93–1, it will be seen that timing circuit 196 generates a timing signal 207 having the same duration as timing signal 112 of FIG. 15, i.e., twice the duration of the shaped pulse 94–1S. Threshold detector 197 generates corresponding threshold signal 208 with differentiating and clipping circuit 198 generating leading and trailing edge differentiated signals 209 and 210 in response to the leading and trailing edges, respectively, of threshold signal 208.

It will be seen that the differentiated trailing edge signal 109 provided by differentiating and clipping circuit 57 "sets" bistable multivibrator 200 to initiate pulse 212, pulse 212 being terminated by the differentiated trailing edge signal 210 provided by differentiating and clipping circuit 198. Pulse 212 thus has the same duration as the shaped pulse 94–1S. Timing circuit 203 thus generates timing signal 213 having a duration twice that of pulse 212 and the shaped pulse 94–1S, and threshold detector 204 provides a corresponding threshold signal 214. Differentiating and clipping circuit 205 in turn provides leading and trailing edge differentiated signals 215, 216 respectively responsive to the leading and trailing edges of the threshold signal 214. It will now be seen that bistable multivibrator 64 is "set" by the pulse 110 and "reset" by the trailing edge differentiated signal 216 thereby to provide "stop-sweep" pulse 217. It will be seen that pulse 217 has the same duration as threshold signal 214 and timing signal 213, i.e., twice that of the fast-sweep "white" initial video signal 94–1, and thus "stop sweep" pulse 217 conforms to the requirement that the duration of the "stop sweep" signal when added to the duration of the shorter fast-sweep "white" initial video signal should bear the same relation to the duration of a fast-sweep "white" initial video signal as the relation of the fast to the slow scanning rates, i.e., 3:1 in the present instance.

It will further be seen that the differentiated leading edge signal 209 provided by differentiating and clipping circuit 198 "sets" bistable multivibrator 199 to initiate pulse 218, the differentiated trailing edge signal 216 provided by the differentiating and clipping circuit 205 terminating pulse 218, and it will see that pulse 218 has a duration equal to that of the fast-sweep "white" initial video signal 94–1 plus the duration of the stop sweep signal 217.

Pulse 218 is delayed by delay line 79 by time T to provide delayed pulse 218D. It will be seen that the differentiated trailing edge signal 17 provided by differentiating and clipping circuit 63 "sets" bistable multivibrator 78 while the differentiated trailing edge signal 219 provided by the differentiating and clipping circuit 82 in response to the trailing edge of the delayed pulse 218D "resets" bistable multivibrator 78 thereby providing output pulse 220 in output circuit 83 of bistable multivibrator 78. It will be seen that output pulse 220 has the same duration as the pulse 218, i.e., the duration of the fast-sweep "white" initial video signal plus the duration of the "stop sweep" pulse 217, but that pulse 220 is generated only if the fast-sweep "white" initial video signal 94–1 has a duration shorter than the respective monostable multivibrator pulse 93–1 thereby to provide pulse 110. It will be readily understood that application of the bistable multivibrator pulse 220 to AND gate 187 enables the same thereby to clamp output circuit 34 to the third potential level of source 189 as shown at 222 in FIGS. 17S and T.

It will now be readily seen that the duration of the third level modified video signal 222 bears the same relationship to the duration of the shorter fast-sweep "white" initial video signal 94–1 as the relationship of the fast to the slow scanning rate, i.e., 3:1.

It will be readily seen that the system of FIG. 16 may be further modified to accommodate higher ratios of fast to slow scanning rates by merely cascading the desired additional number of bistable multivibrators, timing circuits, threshold detectors, and differentiating and clipping circuits corresponding to 200, 203, 204, and 205, respectively.

It will now be readily seen that the transmission time reduction system of the invention offers a number of advantages over prior systems. The system of the present invention does not employ shift register or other storage-type devices which represent the bulk of the cost of such prior systems, and the system of the present invention can readily be incorporated in existing television transmission systems both of the type described and illustrated in the before-mentioned Patent No. 3,251,937, and of the conventional fast scan type. It is seen that sampling of the video signal is not employed in the system of the present invention thus eliminating the reduction in resolution due to quantizing previously discussed. It will finally be seen that the system lends itself to transmission of a gray scale in addition to black and white transmission.

While there have been described above the principles of this invention in connection with specific apparatus, it is to be clearly understood that this description is made only by way of example and not as a limitation to the scope of the invention.

What is claimed is:

1. A television system comprising: camera tube means including means for converting an optical image into a corresponding electrical characteristic pattern and scanning means for converting said pattern into an initial time-based video signal having a first extreme level in response to the presence of information having predetermined characteristics in said image; sweep generating means for selectively actuating said scanning means at relatively fast and slow rates, respectively; means for actuating said sweep generating means to provide said fast scanning rate in response to said first level initial video signal and to provide said slow scanning rate in the absence of said first level initial video signal; means for providing a first control signal in response to a first level initial video signal having a duration shorter than a predetermined time; means for providing in response to said first-named control signal another control signal having a duration which when added to the duration of said shorter first level initial video signal bears the same relation to the duration of said shorter first level initial video signal as the relation of said fast scanning rate to said slow scanning rate; means for interrupting said scanning in response to said other control signal; means for modifying said shorter first level initial video signal in response to said first control signal to provide a video signal having a second level and a duration equal to that of said shorter first level initial video signal plus that of said other control signal, said modifying means passing said initial video signals in unmodified form in the absence of a said first control signal; means for transmitting the modified and unmodified video signals and for receiving the same; signal-to-image converting means including another scanning means for converting the received video signals into an optical image; another sweep generating means for selectively actuating said other scanning means at said fast and slow rates, respectively; and means for actuating said other sweep generating means to provide said fast scanning rate in response to a received video signal having said first level and said slow scanning rate in the absence of said first level received video signals.

2. A television system comprising: camera tube means having output circuit means, said camera tube means including means for converting an optical image into a corresponding electrical characteristic pattern and scanning means for converting said pattern into an initial time-based video signal in said output circuit means variable between first and second extreme levels respectively corresponding to first and second contrasting characteristics of said image; sweep generating means for selectively actuating said scanning means at relatively fast and slow rates, respectively; first means for developing a first control signal in response to and during a said first level initial video signal; means coupling said first developing means to said sweep generating means for actuating the same to provide said fast scanning rate in response to said first control signal and said slow scanning rate in the absence of said first control signal; second means for developing a second control signal in response to a first level initial video signal having a duration shorter than a predetermined time; third means for developing in response to said second control signal a third control signal having a duration which when added to the duration of said shorter first level initial video signal bears the same relation to the duration of said shorter first level initial video signal as the relation of said fast scanning rate to said slow scanning rate; means coupling said third developing means to said sweep generating means for interrupting said scanning in response to and during said third control signal; means coupled to said output circuit means for modifying in response to said second and third control signals a said shorter first level initial video signal to provide a video signal having a third level intermediate said first and second levels and having a duration equal to that of said shorter first level initial video signal plus that of said third control signal, said modifying means passing said initial video signal in unmodified form in the absence of said second and third control signals; means coupled to said modifying means for transmitting the modified and unmodified viedo signal; means for receiving the transmitted video signals; signal-to-image converting means coupled to said receiving means and including other scanning means for converting the received video signals into displayed optical images; another sweep generating means for selectively actuating said other scanning means at said fast and slow rates, respectively; fourth means for developing a fourth control signal in response to and during a received video signal having said first level; and means coupling said fourth developing means to said other sweep generating means to provide said fast scanning rate in response to said fourth control signal and said slow scanning rate in the absence of said fourth control signal.

3. The system of claim 2 wherein said converting means converts both said first and third level received video signals into a displayed optical image having said first characteristic.

4. The system of claim 2 wherein said first developing means includes first sensing means coupled to said output circuit means for sensing the level of said initial video signals, wherein said second developing means includes second sensing means coupled to said first sensing means for sensing the duration of said first level intial video signals, wherein said third developing means includes means coupled to said first and second sensing means, and wherein said modifying means includes means coupled to said first, second and third sensing means.

5. The system of claim 2 wherein one of said characteristics is black and the other is white.

6. The system of claim 2 wherein one of said characteristics is black and the other is white, said optical image being solely composed of black and white information, and wherein said converting means converts both said first and third level received video signals into a displayed optical image having said first characteristic.

7. The system of claim 2 wherein said first developing means includes sensing means coupled to said output circuit means for sensing the level of said initial video signals; wherein said second developing means includes first pulse generating means coupled to said sensing means for generating a first pulse having the duration of said predetermined time in response to a said first control signal, and means coupled to said sensing means and to said first pulse generating means for comparing a said first control signal with a respective first pulse thereby to provide a said second control signal when said first control signal has a duration shorter than said first pulse; and wherein said third developing means includes second pulse generating means coupled to said sensing means for generating in response to a said first control signal a second pulse having a duration which when added to the duration of said first control signal bears the same relation to the duration of the respective first control signal as the relation of said fast scanning rate to said slow scanning rate, and third pulse generating means coupled to said comparing means and to said second pulse generating means and including means for initiating a third pulse in response to said second control signal and for terminating said third pulse in response to termination of said second pulse, said third pulse being said third control signal.

8. The system of claim 2 wherein said modifying means comprises video signal delay means coupled to said output circuit means for delaying said initial video signals by said predetermined time, and means coupled to said delay means for clamping the video signal to a fixed potential during a period having the same duration as the duration of said shorter first level initial video signal plus the duration of said third control signal, said period being initiated after said predetermined time following initiation of a said shorter first level initial video signal, said fixed potential being said third level video signal.

9. The system of claim 7 wherein said modifying means comprises first signal delay means having an input circuit coupled to said output circuit means and having an output circuit, said first delay means delaying said initial video signals by said predetermined time, means coupling said third pulse generating means to said input circuit of said first delay means for clamping the same to a fixed potential in response to said third control signal; second signal delay means having an input circuit coupled to said sensing means and having an output circuit, said second delay means delaying said first control signal by said predetermined time, fourth pulse generating means coupled to said comparing means and to the output circuit of said second delay means for initiating a fourth pulse in response to said second control signal and for terminating said fourth pulse in response to termination of the delayed first control signal, and means coupling said fourth pulse generating means to said output circuit of said first delay means for clamping the same to said fixed potential in response to said fourth pulse, said fixed potential being said third level video signal.

10. The system of claim 2 wherein said first and second contrasting characteristics are white and black, respectively, said optical image being solely composed of black and white information; wherein said first developing means includes means for detecting said first level initial video signals; wherein said second developing means includes first monostable pulse generating means coupled to said detecting means for generating a first pulse having the duration of said predetermined time in response to initiation of a said first control signal, means coupled to said detecting means for inverting said first control signal, first gating circuit means coupled to said first pulse generating means and to said inverting means for providing a said second control signal when an inverted said first control signal has a duration shorter than the respective first pulse; wherein said third developing means includes second pulse generating means coupled to said detecting means for generating in response to a said first control signal a second pulse having a duration which, when added to the duration of the respective first control signal, bears the same relation to the duration of the respective first control signal as the relation of said fast scanning rate to said slow scanning rate, and third bistable pulse generating means coupled to said first adding circuit means and to said second pulse generating means for initiating a said third control signal in response to initiation of a said second control signal and for terminating said third control signal in response to termination of a respective second pulse; wherein said modifying means comprises first signal delay means having an input circuit coupled to said output circuit means and having an output circuit, said first delay means delaying said initial video signals from said camera tube means by said predetermined time, a first source of fixed direct current potential having said third level, second gating circuit means coupling said first source and said third pulse generating means to said input circuit of said first delay means thereby clamping the same to said first potential in response to and during said third control signal; second signal delay means having an input circuit coupled to said detecting means and having an output circuit for delaying said first control signals by said predetermined time, fourth bistable pulse generating means coupled to said first gating circuit means and to said output circuit of said second delay means for initiating a fourth pulse in response to initiation of a said second control signal and for terminating said fourth pulse in response to termination of a respective delayed first control signal, a second source of fixed potential having said third level, and third gating circuit means coupling said second source and said fourth pulse generating means to said output circuit of said first delay means for clamping the same to said second potential in response to and during said fourth pulse; and wherein said converting means converts both said first and third level video signals into white information in the displayed optical image.

11. The system of claim 2 further comprising synchronizing signal generating means coupled to said first-named sweep generating means, encoding means coupled to said synchronizing signal generating means and to said modifying means for providing a coded video signal including discrete steps having said first, second and third levels in response to a said synchronizing signal, and decoding means coupled to said receiving means for decoding said coded video signal and for providing another synchronizing signal in response thereto, said decoding means being coupled to said other sweep generating means.

12. The system of claim 11 wherein said coded video signal comprises steps successively having said second, third, first, third and second levels.

13. The system of claim 2 wherein said modifying means has an output circuit coupled to said transmitting means, and further comprising blanking and synchronizing signal generating means coupled to said camera tube means and to said first-named sweep generating means for blanking said camera tube means to provide a said second level video signal and for resetting said sweep generating means, encoding means coupled to said blanking and synchronizing signal generating means and to said output circuit for providing in response to said blanking and synchronizing signal a coded video signal in the form of a first signal having said third level, a second signal having said first level, and a third signal having said third level, said first, second and third signals occurring in immediate succession, said first signal being immediately preceded, and said third signal being immediately followed by said second level video signals, and decoding means coupled to said receiving means for providing another synchronizing signal in response to said coded video signal, said decoding means being coupled to said other sweep generating means.

14. The system of claim 13 wherein said encoding means comprises first monostable pulse generating means for generating a first pulse in response to initiation of said blanking and synchronizing signal, a first source of fixed potential having said third level, first gating circuit means coupled to said first monostable pulse generating means and to said first source for providing said first signal in response to and during said first pulse, second monostable pulse generating means for generating a second pulse in response to termination of said first pulse, a second source of fixed potential having said first level, second gating circuit means coupled to said second monostable pulse generating means and to said second source for providing said second signal in response to said second pulse, and third monostable pulse generating means coupled to said second monostable pulse generating means for generating a third pulse in response to termination of said second pulse, said third monostable pulse generating means being coupled to said first gating circuit means thereby providing said third signal in response to said third pulse.

15. The system of claim 13 wherein said decoding means comprises means for differentiating said video signal whereby said coded video signal provides first and second successive signal spikes of one polarity followed by third and fourth successive signal spikes of the opposite polarity, first gating circuit means coupled to said differentiating means for passing said first signal spike, first bistable pulse generating means coupled to said first gating circuit means for initiating a first pulse in response to said first signal spike, second gating circuit means coupled to said first bistable pulse generating means and to said differentiating means for passing said second signal spike in the presence of said first pulse, second bistable pulse generating means coupled to said second gating circuit means for initiating a second pulse in response to said second signal spike, said second bistable pulse generating means being coupled to said first gating circuit means by first inverting means for disabling said first gating circuit means, third gating circuit means coupled to said second bistable pulse generating means and to said differentiating means by second inverting means for passing said third signal spike, third bistable pulse generating means coupled to said third gating circuit means for initiating a third pulse in response to said third signal spike, and fourth gating circuit means coupled to said third bistable pulse generating means and to said second inverting means for passing said fourth signal spike thereby providing said other synchronizing signal.

16. The system of claim 2 wherein said first characteristic is white and said second characteristic is black, said optical image being solely composed of black and white information, wherein said fourth developing means includes first means for detecting said first level received video signals, and further comprising means coupling said signal-to-image converting means to said receiving means and including second means for detecting both said first and third level received video signals and for providing output video signals in response thereto, said signal-to-image converting means including means for converting said output video signals into white information in said displayed optical image.

17. A method of television transmission comprising the steps of: converting an optical image into a corresponding electrical characteristic pattern; generating an electron beam; normally deflecting said beam at a first scanning rate thereby to generate a time-based initial video signal variable between first and second extreme levels respectively corresponding to first and second contrasting characteristics of said image; sensing generation of an initial video signal having said first extreme level and deflecting said beam at a second scanning rate faster than said first rate in response thereto; sensing generation of a first level initial video signal having a duration shorter than a predetermined time and interrupting said beam deflection in response thereto for a period of time which when added to the duration of said shorter first level initial video signal bears the same relation to the duration of said shorter first level initial video signal as the relation of said second scanning rate to said first scanning rate; modifying said shorter first level initial video signal in response to said last-named sensing to provide a video signal having a third level intermediate said first and second levels and a duration equal to the duration of said interruption plus the duration of said shorter first level initial video signal; transmitting the modified and unmodified video signals; receiving the transmitted video signals and applying the same to signal-to-image converting means; generating another electron beam; normally deflecting said other beam at said first scanning rate thereby to convert said received video signals into a displayed image; and sensing the presence of a first level video signal in said received video signals and deflecting said other beam at said second rate in response thereto.

18. The method of claim 17 wherein said second and third level video signals are converted into information having said first characteristic in said displayed image.

19. A method of television transmission comprising the steps of: converting an optical image into a corresponding electrical characteristic pattern; generating an electron beam; normally deflecting said beam at a first scanning rate thereby to genearte a time-based initial video signal variable between first and second extreme levels respectively corresponding to first and second contrasting characteristics of said image; sensing generation of an initial video signal having said first extreme level and deflecting said beam at a second scanning rate faster than said first rate in response thereto; generating a first signal having a predetermined duration in response to a respective first level initial video signal; comparing the duration of a first level initial video signal with the duration of said first signal and providing a second signal in response to said first level initial video signal having a duration shorter than the duration of said first signal; generating a third signal in response to said second signal and having a duration which when added to the duration of said shorter first level initial video signal bears the same relation to the duration of said shorter first level initial video signal as the relation of said second scanning rate to said first scanning rate; interrupting said beam deflection in response to and during said third signal; modifying said shorter first level initial video signal in response to said second signal to provide a video signal having a third level intermediate said first and second levels and a duration equal to the duration of said shorter first level initial video signal plus the duration of said third signal; transmitting the modified and unmodified video signals receiving the transmitted video signal and applying the same to signal-to-image converting means; generating another electron beam; normally deflecting said other beam at said first scanning rate thereby to convert said received video signals into a displayed image; and sensing the presence of a first level video signal in said received video signals and deflecting said other beam at said second rate in response thereto.

20. The method of claim 19 wherein said modifying step comprises clamping said initial video signal to a fixed potential having said third level, and delaying said video signal for said predetermined time.

21. The method of claim 19 comprising the further steps of generating first synchronizing signals and resetting deflection of said first-named beam in response thereto, generating in response to a said first synchronizing signal coded synchronizing signals including discrete steps having said first, second and third levels, transmitting said coded synchronizing signals, decoding the received coded synchronizing signals to provide second synchronizing signals in response thereto, and resetting deflection of said last-named beam in response to said second synchronizing signals.

22. The method of claim 21 wherein said coded synchronizing signals comprises steps successively having said second, third, first, third and second levels.

References Cited

UNITED STATES PATENTS

| | | | |
|---|---|---|---|
| 2,752,241 | 6/1956 | Ross | 178—6.8 |
| 2,957,941 | 10/1960 | Covely | 178—6 |
| 3,215,773 | 11/1965 | Chatten | 179—15.55 |
| 3,251,937 | 5/1966 | Hoag | 178—6 |
| 3,286,026 | 11/1966 | Greutman | 178—6.8 |

JOHN W. CALDWELL, *Acting Primary Examiner.*

J. A. ORSINO, *Assistant Examiner.*